(12) United States Patent
Kim et al.

(10) Patent No.: US 8,756,966 B2
(45) Date of Patent: Jun. 24, 2014

(54) PILGER DIE AND PILGER MANDREL FOR MANUFACTURING DASHPOT TUBE FOR NUCLEAR FUEL ASSEMBLY AND METHOD OF MANUFACTURING THE PILGER DIE AND THE PILGER MANDREL

(75) Inventors: Sun Doo Kim, Daejon (KR); Chan Hyun Park, Daejon (KR); In Kyu Kim, Daejon (KR); Ki Bum Park, Daejon (KR); Seung Hwan Lee, Daejon (KR)

(73) Assignee: Kepco Nuclear Fuel Co., Ltd., Daejeon (KR)

( * ) Notice: Subject to any disclaimer, the term of this patent is extended or adjusted under 35 U.S.C. 154(b) by 759 days.

(21) Appl. No.: 13/117,981

(22) Filed: May 27, 2011

(65) Prior Publication Data

US 2012/0079864 A1 Apr. 5, 2012

(30) Foreign Application Priority Data

Sep. 30, 2010 (KR) ........................ 10-2010-0095317

(51) Int. Cl.
*B21B 17/02* (2006.01)

(52) U.S. Cl.
USPC ............................................ 72/209; 72/252.5

(58) Field of Classification Search
USPC ......................................... 72/208, 209, 252.5
See application file for complete search history.

(56) References Cited

U.S. PATENT DOCUMENTS 3,890,821 A * 6/1975 Gerretz et al. ................... 72/208
4,445,354 A * 5/1984 Pfeiffer et al. ................... 72/208
4,866,968 A * 9/1989 Cellier et al. .................... 72/208

* cited by examiner

*Primary Examiner* — Debra Sullivan
(74) *Attorney, Agent, or Firm* — Rabin & Berdo, P.C.

(57) ABSTRACT

A pilger die and a pilger mandrel which are used to produce a dashpot tube which can be used in a nuclear fuel assembly having an outer diameter of 31.75 mm or less and an inner diameter 25.654 mm or less, by processing a reduced expression zirconium alloy tube in two pilgering processes (a first step pass and a second step pass) using a single pilgering apparatus. Furthermore, provided are methods of manufacturing the pilger die and the pilger mandrel, and the dashpot tube for the nuclear fuel assembly. The dashpot tube can be manufactured by the single pilgering apparatus provided with the pilger die and the pilger mandrel.

10 Claims, 9 Drawing Sheets

PILGER DIE AND PILGER MANDREL FOR MANUFACTURING DASHPOT TUBE FOR NUCLEAR FUEL ASSEMBLY AND METHOD OF MANUFACTURING THE PILGER DIE AND THE PILGER MANDREL

CROSS-REFERENCE TO RELATED APPLICATIONS

The present application claims priority under U.S.C. 119 to Korean Patent Application No. 10-2010-0095317, filed on Sep. 30, 2010, the disclosure of which is expressly incorporated herein by reference in its entirety.

BACKGROUND OF THE INVENTION

1. Field of the Invention

The present invention relates to a pilger die and a pilger mandrel which are used to produce a dashpot tube having an outer diameter of 31.75 mm or less and an inner diameter 25.654 mm or less by processing a zirconium alloy tube (a material tube reduced extrusion, TREX) in two pilgering processes (a first step pass and a second step pass) using a single pilgering apparatus, and methods of manufacturing the pilger die and the pilger mandrel, and a dashpot tube for a nuclear fuel assembly.

2. Description of the Related Art

Generally, zirconium alloy tubes are widely used in the frameworks of nuclear fuel assemblies, including nuclear-fuel-rod-cladding tubes, guide thimble tubes, instrument tubes, dashpot tubes, sleeves, etc. In other words, the zirconium alloy tubes are critical elements for nuclear fuel assemblies installed in light-water reactor type or heavy-water reactor type nuclear power plants.

In such nuclear fuel assembly frameworks, the dashpot tubes have an outer diameter less than that of the guide thimble tubes. The dashpot tubes function to control the speed at which control rods fall when the control rods are inserted into the nuclear fuel assemblies, thereby absorbing the shocks applied to the control rods. Furthermore, the dashpot tubes absorb external forces generated when the nuclear fuel assemblies are inserted into nuclear reactors, or when the nuclear reactors are being operated, thus reducing the shocks applied to the nuclear fuel assemblies.

Recently, the development of an improved nuclear fuel assembly for nuclear power generation has instigated the creation of a guide thimble tube which is an element of the improved nuclear fuel assembly and is designed by a new method (a tube-in-tube method). Here, a dashpot tube is required to be manufactured in such a manner that a zirconium alloy tube, such as a material tube reduced extrusion (TREX) having an outer diameter of 63.5 mm and an inner diameter of 41.66 mm is formed into an intermediate product having an outer diameter of 31.75 mm and an inner diameter of 25.65 mm, and then formed into a final product having an outer diameter of 22.6 mm and an inner diameter of 21.23 mm, by a 50LC (a model number for pilgering machine) pilgering apparatus. During the process of manufacturing the dashpot tube, each pilgering pass includes a washing process, a pickling process and a heat treatment process.

The pilgering, which includes the multi-step pilgering passes, establishes not only measurements of the dashpot tube but also its physical properties. In detail, the zirconium alloy tube which is the dashpot tube has radius-directional textures. If the textures of the zirconium alloy tube are oriented in the radial direction of the tube, hydrogen embrittlement is induced when the tube is installed in the nuclear reactor and the reactor is operating. Therefore, the textures of the zirconium alloy tube must be oriented in the circumferential direction, that is, in which the textures extend along the circumference of the tube.

The orientation of the textures of the zirconium alloy tube is designated as a factor $Q$ ($=(\ln[t0-t2]/t0)/\ln(D0-D2)/D0)$) which is a natural logarithm ratio of a reduction of a thickness to a reduction of the outer diameter during the pilgering process. Here, $t0$ and $D0$ respectively denote the thickness and the outer diameter of the tube before the pilgering is conducted, and $t2$ and $D2$ respectively denote the thickness and the outer diameter of the tube after the pilgering has been completed. As the value of the factor $Q$ increases, the compression efficiency is enhanced. When the factor $Q$ is 1 or more, the textures of the zirconium alloy tube are oriented in the circumferential direction. Hence, in the conventional technique for processing the zirconium alloy tube, the factor $Q$ is 1 or more and, typically, it is designed to fall within the range of from 1 to 4, taking into account the compression efficiency.

Furthermore, to improve the operating performance and the quality of the nuclear fuel assembly to bring it in line with the development of the nuclear fuel assembly using the above-mentioned dashpot tube, a dashpot tube having a relatively small diameter, for example, having an outer diameter of 22.6 mm and an inner diameter of 21.23 mm, which cannot be pilgered by the conventional 50LC pilgering apparatus, is required.

That is, in the conventional technique, there is neither a pilger die nor a pilger mandrel that can manufacture a dashpot tube having a relatively small diameter, for example, having an outer diameter of 22.6 mm and an inner diameter of 21.23 mm, using the 50LC pilgering apparatus. Thus, after a zirconium alloy tube is pilgered into an intermediate product having an outer diameter of 31.75 mm and an inner diameter of 25.65_mm by the 50LC pilgering apparatus, the intermediate product is transferred to a separate 25LC pilgering apparatus, because the 50LC pilgering apparatus cannot form a dashpot tube which has a diameter and thickness less than these values. Thereafter, the 25LC pilgering apparatus pilgers the intermediate product, thus producing the dashpot tube having the outer diameter of 22.6 mm and the inner diameter of 21.23 mm.

As such, to manufacture the relatively-small-diameter dashpot tube which cannot be produced by the 50LC pilgering apparatus, the intermediate product pilgered by the 50LC pilgering apparatus must be transferred to the 25LC pilgering apparatus to conduct the second pilgering process. Every time after a pilgering process is conducted, the washing process, the pickling process and the heat treatment process must be carried out. As a result, the time taken to manufacture the dashpot tube is increased, and thus, the production cost of the dashpot tube is increased.

Furthermore, in the case where a dashpot tube having a relatively small diameter, for example, having an outer diameter of 22.6 mm and an inner diameter of 21.23 mm, is manufactured by pilgering the first-pilgered zirconium alloy tube using the 25LC pilgering apparatus, it is difficult to increase the factor $Q$ to 4 or more to ensure structural integrity of the tube. In addition, there are other problems, in that the measurements of the tube are not uniform, it is not easy to control the orientation of the textures of the tube and, when the nuclear fuel assembly provided with the dashpot tube having the above-mentioned problems is installed in the nuclear reactor, the stability of the operation of the nuclear reactor is substantially reduced.

Therefore, the development of a pilger die and a pilger mandrel is required which make it possible to manufacture the dashpot tube having a relatively small diameter, for example, having an outer diameter of 22.6 mm and an inner diameter of 21.23_ mm, only using the 50LC pilgering apparatus, without transferring an intermediate product from the 50LC pilgering apparatus to the 25LC pilgering apparatus.

SUMMARY OF THE INVENTION

Accordingly, the present invention has been made keeping in mind the above problems occurring in the prior art, and an object of the present invention is to provide a pilger die and a pilger mandrel which make it possible for a single pilgering apparatus to pilger (first-step pass) a material tube referred to as "TREX," such that the outer diameter of the tube is changed from 63.5 mm into 31.75 mm and the inner diameter of the tube is changed from 41.66 mm into 25.65 mm, and then pilger (second-step pass) the intermediate product to form a dashpot tube having a relatively small diameter, for example, having an outer diameter 22.6 mm and an inner diameter 21.23 mm. Unlike conventional techniques in which the pilgering apparatus which has conducted the first-step pilgering cannot conduct the second-step pilgering, the first-step and second-step pilgering is done by a single apparatus thus enhancing the efficiency of producing the dashpot tube and reducing the production cost. Another object of the invention is to provide methods of manufacturing the pilger die and the pilger mandrel.

Another object of the present invention is to provide a pilger die and a pilger mandrel, and methods of manufacturing the die and mandrel, which make it possible to produce a dashpot tube having a factor Q of 4 or more and a relatively small diameter, for example, having an outer diameter of 22.6 mm and an inner diameter of 21.23 mm, and the two pilgering processes can be accomplished using only a single pilgering apparatus, thus enhancing the performance of the dashpot tube.

A further object of the present invention is to provide a dashpot tube for a nuclear fuel assembly which has a factor Q of 3 or more and a relatively small diameter, for example, having an outer diameter 22.6 mm and an inner diameter 21.23 mm, in such a way as to process a material tube referred to as TREX having an outer diameter 63.5 mm and an inner diameter 41.66 mm in two pilgering processes (first-step and second-step passes) using only a single pilgering apparatus, unlike conventional techniques in which the pilgering apparatus which conducts the first-step pass cannot conduct the second-step pass.

In order to accomplish the above objects, one embodiment of the present invention provides a pilger die of a pilgering apparatus for producing a dashpot tube for a nuclear fuel assembly through two pilgering processes (a first-step pass and a second-step pass) within an allowable error range of 3% or less, the pilger die conducting a second-step pass and having a pilger groove including: a working section formed along a circumferential outer surface of the pilger die by grinding such that a radius Rx(x) of the groove is reduced from, at a pilgering start point, a half of an initial outer diameter of a zirconium alloy tube formed by first-pilgering (the first-step pass) of a material tube to, at a pilgering end point, a half of a final outer diameter of a second-pilgered zirconium alloy tube; a sizing section extending a predetermined length from a tail end of the working section, the sizing section being formed by grinding so that the radius Rx(x) of the groove has a constant value in the half of the final outer diameter of the second-pilgered zirconium alloy tube; a roll off section extending a predetermined length from a tail end of the sizing section, the roll off section being formed by grinding such that the radius Rx(x) of the groove is increased from the half of the final outer diameter of the second-pilgered zirconium alloy tube; and a pocket section connecting the roll off section to the working section. The working section is formed by grinding such that the radius Rx(x) of the groove is a radius (Dx(x)/2) of a circle having a center at a position spaced apart from the circumferential outer surface of the pilger die by a die gap (Ws) in the radial direction. A pilger die equation for defining the outer diameter of the zirconium alloy tube is $Dx(x)=OD_f+X(x)^{Cx} \cdot (OD_s-OD_f-MT_d(x) \cdot WL-MC(x))+X(x) \cdot MT_d(x) \cdot WL$, and a pilger mandrel equation for defining an outer diameter of a pilger mandrel is $Mx(x)=ID_f+X(x)^{Cx} \cdot (ID_s-ID_f-MTm(x) \cdot WL-MC(x))+X(x) \cdot MT_m(x) \cdot WL$, where:

WL=a length of the working section, x=relative position coordinates (1.0, 0.9, . . . , 0.0, −0.1, −0.2 . . . ), wherein the length WL of the working section is sectioned into equal parts, and a relative position coordinate of the tail end of the working section is designated as 0.0, and relative position coordinates of the sectioned parts are increased in an increment of 0.1 from the position of 0.0 towards a left side (away from the sizing section) to a leading end of the working section which has a relative position coordinate of 1.0, and the relative position coordinates are reduced in decrements of −0.1 from the position x=0.0 towards a right side (toward the sizing section);

X(x)=a distance rate (x·WL/40) from 0.0 of the working section to a position coordinate x;

Mx(0.0)=an outer diameter of the pilger mandrel when x is 0.0, Mx(0.0) being set to a value greater than a final inner diameter of the zirconium alloy tube by 1.5% to 3.5%;

Mx(1.0)=an outer diameter of the pilger mandrel when x is 1.0, Mx(1.0) being set to a value greater than the initial outer diameter of the zirconium alloy tube by 0.2% to 0.5%;

$OD_s$=the initial outer diameter of the zirconium alloy tube;

$OD_f$=the final outer diameter of the zirconium alloy tube;

Cx=a curve value (1.9-2.3) of the groove;

Mx(x)=an outer diameter of the pilger mandrel at a position coordinate x;

$MT_d(x)=MT_m(x)$=a decrement of the outer diameter of the pilger mandrel from the position coordinate 0.0 towards the right side (towards the sizing section) to a position coordinate x=(the outer diameter of the pilger mandrel when x is 0.0−Mx(f))·(−x)/the number of sectioned parts, (x= . . . 0.1, 0.0, −0.1, . . . ,);

Mx(f)=an outer diameter of a tail end of the pilger mandrel, Mx(f) being set to a value less than the final inner diameter of the zirconium alloy tube by 5% to 8%;

Mx(1.0), which is an outer diameter of the pilger mandrel when x is 1.0, is set to a value less than an initial inner diameter of the zirconium alloy tube by 0.7 mm to 3.56 mm;

Mx(0.0), which is an outer diameter of the pilger mandrel when x is 0.0, is set to a value greater than a thickness of W(0.0) by 1.5% to 3.5%;

MC(x)=a mandrel clearance=0.381 mm·|x|;

$ID_s$=the initial inner diameter of the zirconium alloy tube; and $ID_f$=the final inner diameter of the zirconium alloy tube.

The pilger groove can further include a top side relief formed by grinding the pilger die in a circumferential direction, such that a circle defined by the top side relief has a center C3 at a position spaced apart from a center C1 of the circle, defined by the radius $Rx(x)$ of the groove, by $Bt(x)$ in the radial direction of the pilger die, and has a radius $Rt(x)$, where:

$Bt(x)=((Wd(x)/2)^2-Rx(x)^2+(Ws/2)^2)/(2(Rx(x)\cdot\sin(\alpha(x))-Ws/2))$;

$\alpha(x)=55°-20°\cdot(1-x)$;

$Rt(x)=((Wd(x)/2)^2+(Bt(x)+Ws/2)^2)^{1/2}$;

$Wd(x)/2=((Dx(x)/2)^2-(Ws/2)^2)^{1/2}+Ft(x)$;

$Ft(x)$ (a maximum distance between the groove and the top side relief)$=(Dx(y(x))-Dx(x))/2$;

$y(x)$ (a new coordinate x varied depending on a tube feed rate (TubeInFeed), the new coordinate x at which the zirconium alloy tube comes into contact with the pilger die)$=x+(AD(1.0)\cdot W(1.0)\cdot TubeInFeed)/(AD(x)\cdot W(x)\cdot WL)$;

$W(x)$ (a thickness of the zirconium alloy tube at a position of $x$)$=(Dx(x)-Mx(x))/2$;

$AD(x)=(Dx(x)+Mx(x))/2$; $Dx(y(x))$=an outer diameter of the zirconium alloy tube at a position of $y(x)$;

$AD(1.0)$=a medial outer diameter between the inner diameter of the zirconium alloy tube and the outer diameter of the pilger mandrel at a position of $x=1.0$;

TubeInFeed=a tube feed rate which is a length of the zirconium alloy tube that is fed during one stroke in which a saddle reciprocates between an inlet position ET and an outlet position AT; and $\alpha(x)$=an angle between a line connecting the center of the circle (groove circle) defined by the groove to a start point of the top side relief and a horizontal line passing through the center of the groove circle.

The top side relief can be formed by grinding, such that the angle between the horizontal line and the line connecting the center of the groove circle to the start point of the top side relief is kept constant at 35°, and the radius $Rt(x)$ of the top side relief is set to a value greater than a final radius of the zirconium alloy tube at the tail end ($x=0.0$) of the working section by 0.6% to 0.8%.

The roll off section can be formed such that the radius $Rx(x)$ of the groove is increased in an increment of (the outer diameter of the pilger mandrel when x is 0.0–$Mx(f))\cdot(-x)/$the number of sectioned parts), where $x=\ldots 0.1, 0.0, -0.1, \ldots$.

In another embodiment, the present invention provides a pilger mandrel of a pilgering apparatus for producing a dashpot tube for a nuclear fuel assembly through two pilgering processes (a first-step pass and a second-step pass) within an allowable error range of 3% or less, the pilger mandrel conducting a second-step pass pilgering and including: a mandrel working section having a length corresponding to a length of a working section of a pilger die of the pilgering apparatus, the mandrel working section being formed by grinding in such a way that an outer diameter $Mx(x)$ of the pilger mandrel is reduced from a position of $x=1.0$ to a position of $x=0.0$ such that the outer diameter of the pilger mandrel at the position of $x=1.0$ is less than an initial inner diameter of a zirconium alloy tube by 0.7 mm to 3.56 mm, and the outer diameter of the pilger mandrel at the position of $x=0.0$ is greater than a final inner diameter of the zirconium alloy tube by 1.5% to 3.5%; and a mandrel sizing section extending from tail end of the mandrel working section along a longitudinal direction of the pilger mandrel, the mandrel sizing section being formed by grinding such that the outer diameter $Mx(x)$ of the pilger mandrel has at a leading end thereof a value greater than the final inner diameter of the zirconium alloy tube by 1.5% to 3.5%, and is reduced from the leading end to a tail end thereof along the longitudinal direction of the pilger mandrel. A pilger die equation for defining the outer diameter of the zirconium alloy tube is: $Dx(x)=OD_f+X(x)^{Cx}\cdot(OD_s-OD_f-MT_d(x)\cdot WL-MC(x))+X(x)\cdot MT_d(x)\cdot WL$, and a pilger mandrel equation for defining an outer diameter of the pilger mandrel is: $Mx(x)=ID_f+X(x)^{Cx}\cdot(ID_s-ID_f-MTm(x)\cdot WL-MC(x))+X(x)\cdot MT_m(x)\cdot WL$, where:

WL=a length of the working section;

x=relative position coordinates (1.0, 0.9, ..., 0.0, −0.1, −0.2 ...), where the length WL of the working section is sectioned into equal parts, and a relative position coordinate of the tail end of the working section is designated as 0.0, and relative position coordinates of the sectioned parts are increased in increments of 0.1 from the position of 0.0 towards a left side (away from the sizing section) to a leading end of the working section which has a relative position coordinate of 1.0, and the relative position coordinates are reduced in decrements of −0.1 from the position x=0.0 towards a right side (towards the sizing section);

$X(x)$=a distance rate $(x\cdot WL/40)$ from 0.0 of the working section to a position coordinate x;

$Mx(0.0)$=an outer diameter of the pilger mandrel when x is 0.0, $Mx(0.0)$ being set to a value greater than a final inner diameter of the zirconium alloy tube by 1.5% to 3.5%;

$Mx(1.0)$=an outer diameter of the pilger mandrel when x is 1.0, $Mx(1.0)$ being set to a value greater than an initial outer diameter of the zirconium alloy tube by 0.2% to 0.5%;

$OD_s$=an initial outer diameter of the zirconium alloy tube;

$OD_f$=a final outer diameter of the zirconium alloy tube;

Cx=a curve value (1.9-2.3) of the groove;

$Mx(x)$=an outer diameter of the pilger mandrel at a position coordinate x;

$MT_d(x)=MT_m(x)$=a decrement of the outer diameter of the pilger mandrel from the position coordinate 0.0 towards the right side (towards the sizing section) to a position coordinate x=(the outer diameter of the pilger mandrel when x is 0.0–$Mx(f))\cdot(-x)/$the number of sectioned parts), $(x=\ldots 0.1, 0.0, -0.1, \ldots,)$;

$Mx(f)$=an outer diameter of the tail end of the pilger mandrel, $Mx(f)$ being set to a value less than the final inner diameter of the zirconium alloy tube by 5% to 8%;

$Mx(1.0)$, which is an outer diameter of the pilger mandrel when x is 1.0 is set to a value less than an initial inner diameter of the zirconium alloy tube by 0.7 mm to 3.56 mm;

$Mx(0.0)$, which is an outer diameter of the pilger mandrel when x is 0.0 is set to a value greater than a thickness of $W(0.0)$ by 1.5% to 3.5%;

$MC(x)$=a mandrel clearance=$0.381$ mm$\cdot|x|$;

$ID_s$=the initial inner diameter of the zirconium alloy tube; and $ID_f$=the final inner diameter of the zirconium alloy tube.

The mandrel sizing section can be formed by grinding, such that the outer diameter thereof is reduced from the outer diameter $Mx(0.0)$, which is greater than the final inner diameter of the zirconium alloy tube at the position of x=0.0, at which the tail end of the mandrel working section is disposed, in a decrement of $(Mx(0.0)-Mx(f))\cdot(-$position coordinate$)/$(the number of sectioned parts), and the outer diameter $Mx(f)$ of the tail end of the pilger mandrel is set to a value less than the final inner diameter of the zirconium alloy tube by 5% to 8%.

In a further embodiment, the present invention provides a dashpot tube for a nuclear fuel assembly, the dashpot tube being formed by pilgering a zirconium alloy tube such that an outer diameter of the tube is changed from 31.75 mm to 22.6_ mm, and an inner diameter of the tube is changed from 25.65_ mm to 21.23 mm, within an allowable error range of 3% or less, so that a factor Q (a natural logarithm ratio of a reduction of a tube wall thickness to a reduction of the tube outer diameter) is 4 or more.

In still another embodiment, the present invention provides a method of manufacturing a pilger die of a pilgering apparatus for producing a dashpot tube for a nuclear fuel assembly through two pilgering processes (a first-step pass and a second-step pass) within an allowable error range of 3% or less, the method including: forming a groove on the pilger die from a pilgering start point such that a radius Rx(x) of the groove is a radius (Dx(x)/2) of a circle having a center at a position spaced apart from a circumferential outer surface of the pilger die by a die gap (Ws) in the radial direction, the forming of the groove including forming a working section along the circumferential outer surface of the pilger die by grinding such that the radius Rx(x) of the groove is reduced from a half of an initial outer diameter of a first-pilgered zirconium alloy tube to, at a pilgering end point, a half of a final outer diameter of a second-pilgered zirconium alloy tube; forming a sizing section extending a predetermined length from a tail end of the working section, the sizing section being formed by grinding such that the radius Rx(x) of the groove is constant in the half of the final outer diameter of the second-pilgered zirconium alloy tube; forming a roll off section extending a predetermined length from a tail end of the sizing section, the roll off section being formed by grinding such that the radius Rx(x) of the groove is increased from the half of the final outer diameter of the second-pilgered zirconium alloy tube, and forming a pocket section connecting the roll off section to the working section; and forming a top side relief by grinding the pilger die in a circumferential direction such that a circle defined by the top side relief has a center C3 at a position spaced apart from a center C1 of the circle, defined by the radius Rx(x) of the groove, by a Bt(x) in the radial direction of the pilger die, and has a radius Rt(x), where:

WL=a length of the working section;

x=relative position coordinates (1.0, 0.9, . . . , 0.0, −0.1, −0.2 . . . ), where the length WL of the working section is sectioned into equal parts, and a relative position coordinate of the tail end of the working section is designated as 0.0, and relative position coordinates of the sectioned parts are increased in an increment of 0.1 from the position of 0.0 towards a left side (away from the sizing section) to a leading end of the working section which has a relative position coordinate of 1.0, and the relative position coordinates are reduced in decrements of −0.1 from the position x=0.0 towards a right side (towards the sizing section);

X(x)=a distance rate (x·WL/40) from 0.0 of the working section to a position coordinate x;

Mx(0.0)=an outer diameter of the pilger mandrel when x is 0.0, Mx(0.0) being set to a value greater than a final inner diameter of the zirconium alloy tube by 1.5% to 3.5%;

Mx(1.0)=an outer diameter of the pilger mandrel when x is 1.0, Mx(1.0) being set to a value greater than the initial outer diameter of the zirconium alloy tube by 0.2% to 0.5%;

$OD_s$=the initial outer diameter of the zirconium alloy tube;

$OD_f$=the final outer diameter of the zirconium alloy tube;

Cx=a curve value (1.9-2.3) of the groove;

Mx(x)=an outer diameter of the pilger mandrel at a position coordinate x;

$MT_d(x)=MT_m(x)$=a decrement of the outer diameter of the pilger mandrel from the position coordinate 0.0 towards the right side (towards the sizing section) to a position coordinate x=(the outer diameter of the pilger mandrel when x is 0.0−Mx(f))·(−x)/the number of sectioned parts, (x=−0.1, 0.0, −0.1, . . . ,);

Mx(f)=an outer diameter of the tail end of the pilger mandrel, Mx(f) being set to a value less than the final inner diameter of the zirconium alloy tube by 5% to 8%;

Mx(1.0), which is an outer diameter of the pilger mandrel when x is 1.0, is set to a value less than an initial inner diameter of the zirconium alloy tube by 0.7 mm to 3.56 mm;

Mx(0.0), which is an outer diameter of the pilger mandrel when x is 0.0, is set to a value greater than a thickness of W(0.0) by 1.5% to 3.5%;

MC(x)=a mandrel clearance=0.381 mm·|x|;

$ID_s$=the initial inner diameter of the zirconium alloy tube;

$ID_f$=the final inner diameter of the zirconium alloy tube;

$Bt(x)=((Wd(x)/2)^2-Rx(x)^2+(Ws/2)^2)/(2(Rx(x)\cdot\sin(\alpha(x))-Ws/2))$;

$\alpha(x)=55°-20°\cdot(1-x)$;

$Rt(x)=((Wd(x)/2)^2+(Bt(x)+Ws/2)^2)^{1/2}$;

$Wd(x)/2=((Dx(x)/2)^2-(Ws/2)^2)^{1/2}+Ft(x)$;

Ft(x) (a maximum distance between the groove and the top side relief)=(Dx(y(x))−Dx(x))/2;

y(x) (a new coordinate x varied depending on a tube feed rate (TubeInFeed), the new coordinate x at which the zirconium alloy tube comes into contact with the pilger die), =x+(AD(1.0)·W(1.0)·TubeInFeed)/(AD(x)·W(x)·WL);

W(x) (a thickness of the zirconium alloy tube at a position of x)=(Dx(x)−Mx(x))/2;

AD(x)=(Dx(x)+Mx(x))/2;

Dx(y(x))=an outer diameter of the zirconium alloy tube at a position of y(x);

AD(1.0)=a medial outer diameter between the inner diameter of the zirconium alloy tube and the outer diameter of the pilger mandrel at a position of x=1.0;

TubeInFeed=a tube feed rate, a length of the zirconium alloy tube that is fed during one stroke in which a saddle reciprocates between an inlet position ET and an outlet position AT; and α(x)=an angle between a line connecting the center of the circle (groove circle) defined by the groove to a start point of the top side relief and a horizontal line passing through the center of the groove circle.

In yet another embodiment, the present invention provides a method of manufacturing a pilger mandrel of a pilgering apparatus for producing a dashpot tube for a nuclear fuel assembly through two pilgering processes (a first-step pass and a second-step pass) within an allowable error range of 3% or less, the method including: forming a mandrel working section by grinding the pilger mandrel such that a length of the mandrel corresponds to a length of a working section of a pilger die of the pilgering apparatus, and an outer diameter Mx(x) of the pilger mandrel is reduced from a position of x=1.0 to a position of x=0.0 such that the outer diameter of the pilger mandrel at the position of x=1.0 is less than an initial inner diameter of a zirconium alloy tube by 0.7 mm to 3.56 mm and the outer diameter of the pilger mandrel at the position of x=0.0 is greater than a final inner diameter of the zirconium alloy tube by 1.5% to 3.5%; and forming a mandrel sizing section by grinding the pilger mandrel from a tail end of the mandrel working section along a longitudinal direction of the pilger mandrel, such that the outer diameter Mx(x) of the pilger mandrel has at a leading end a value greater than the final inner diameter of the zirconium alloy tube by 1.5% to 3.5%, and is reduced from the leading end to a tail end along the longitudinal direction of the pilger mandrel.

A pilger die equation for defining the outer diameter of the zirconium alloy tube is $Dx(x)=OD_f+X(x)^{Cx}\cdot(OD_s-OD_f-MT_d(x)\cdot WL-MC(x))+X(x)\cdot MT_d(x)\cdot WL$, and a pilger mandrel equation for defining an outer diameter of the pilger mandrel is $Mx(x)=ID_f+X(x)^{Cx}\cdot(ID_s-ID_f-MTm(x)\cdot WL-MC(x))+X(x)\cdot MT_m(x)\cdot WL$, where:
WL=a length of the working section;
x=relative position coordinates (1.0, 0.9, . . . , 0.0, −0.1, −0.2 . . . ), where the length WL of the working section is sectioned into equal parts, and a relative position coordinate of the tail end of the working section is designated as 0.0, and relative position coordinates of the sectioned parts are increased in an increment of 0.1 from the position of 0.0 towards a left side (toward the working section) to a leading end of the working section which has a relative position coordinate of 1.0, and the relative position coordinates are reduced in decrements of −0.1 from the position x=0.0 towards a right side (toward the sizing section).

X(x)=a distance rate (x·WL/40) from 0.0 of the working section to a position coordinate x;

Mx(0.0)=an outer diameter of the pilger mandrel when x is 0.0, Mx(0.0) being set to a value greater than a final inner diameter of the zirconium alloy tube by 1.5% to 3.5%;

Mx(1.0)=an outer diameter of the pilger mandrel when x is 1.0, Mx(1.0) being set to a value greater than an initial outer diameter of the zirconium alloy tube by 0.2% to 0.5%;

$OD_s$=an initial outer diameter of the zirconium alloy tube;
$OD_f$=a final outer diameter of the zirconium alloy tube;
Cx=a curve value (1.9-2.3) of the groove;
Mx(x)=an outer diameter of the pilger mandrel at a position coordinate x;

$MT_d(x)=MT_m(x)$=a decrement of the outer diameter of the pilger mandrel from the position coordinate 0.0 towards the right side to a position coordinate x=(the outer diameter of the pilger mandrel when x is 0.0−Mx(f))·(−x)/the number of sectioned parts), (x= . . . 0.1, 0.0, −0.1, . . . ,);

Mx(f)=an outer diameter of a tail end of the pilger mandrel, Mx(f) being set to a value less than the final inner diameter of the zirconium alloy tube by 5% to 8%;

Mx(1.0), which is an outer diameter of the pilger mandrel when x is 1.0, is set to a value less than an initial inner diameter of the zirconium alloy tube by 0.7 mm to 3.56 mm;

Mx(0.0), which is an outer diameter of the pilger mandrel when x is 0.0, is set to a value greater than a thickness of W(0.0) by 1.5% to 3.5%;

MC(x)=a mandrel clearance=0.381 mm·|x|;
$ID_s$=the initial inner diameter of the zirconium alloy tube; and
$ID_f$=the final inner diameter of the zirconium alloy tube.

The forming of the mandrel sizing section includes: grinding the pilger mandrel such that the outer diameter of the mandrel sizing section is reduced from the outer diameter Mx(0.0), which is greater than the final inner diameter of the zirconium alloy tube at the position of x=0.0 at which the tail end of the mandrel working section is disposed, in a decrement of (Mx(0.0)−Mx(f))·(−position coordinate)/(the number of sectioned parts); and setting the outer diameter Mx(f) of the tail end of the pilger mandrel to a value less than the final inner diameter of the zirconium alloy tube by 5% to 8%.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, an embodiment of the present invention will be described in detail with reference to the attached drawings.

Figure 8:
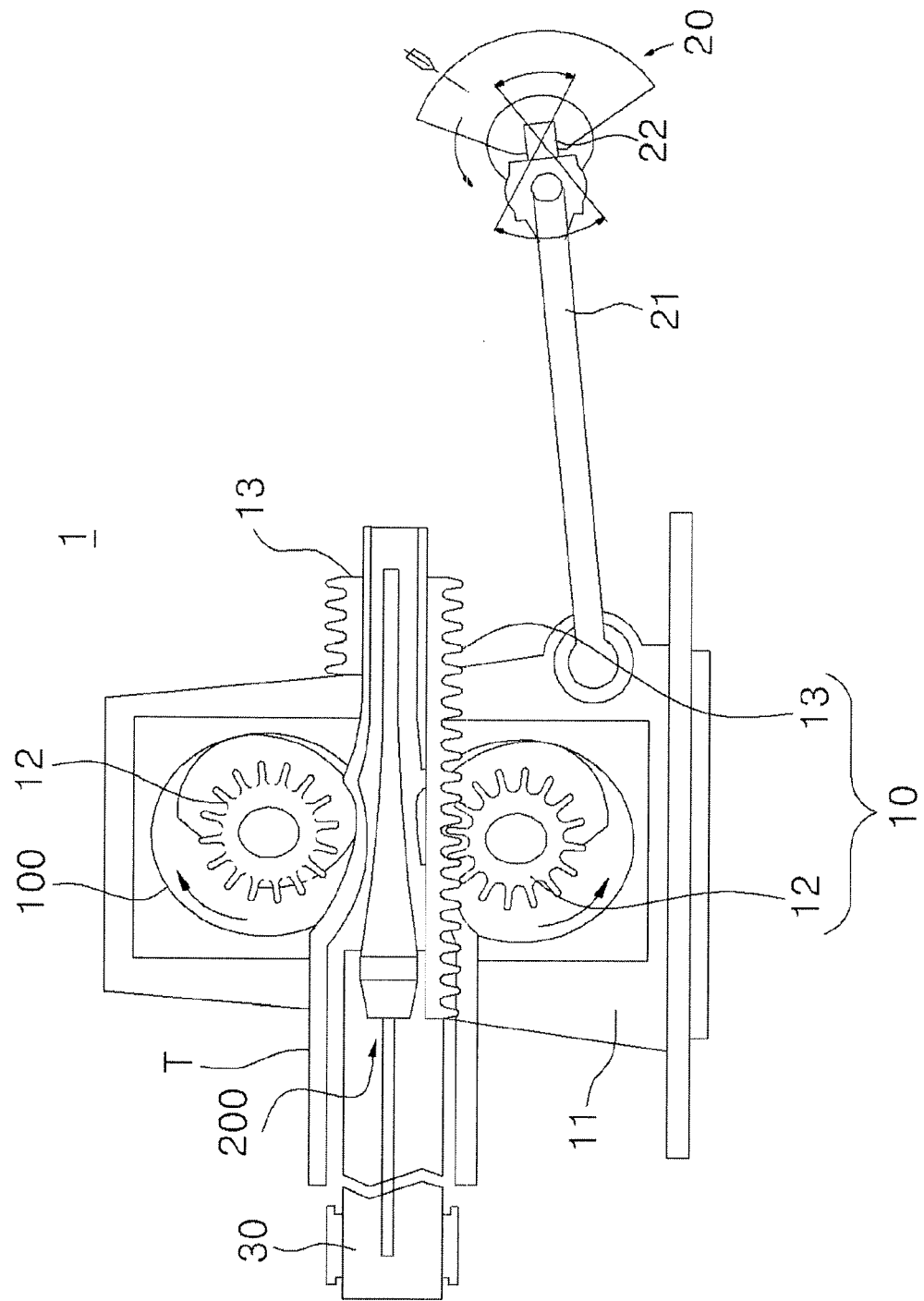
FIG. 8 is a view showing a pilgering apparatus including a saddle unit and a crank drive unit, the saddle unit being provided with the pilger dies of FIG. 1 and the pilger mandrel of FIG. 4.
Figure 9:
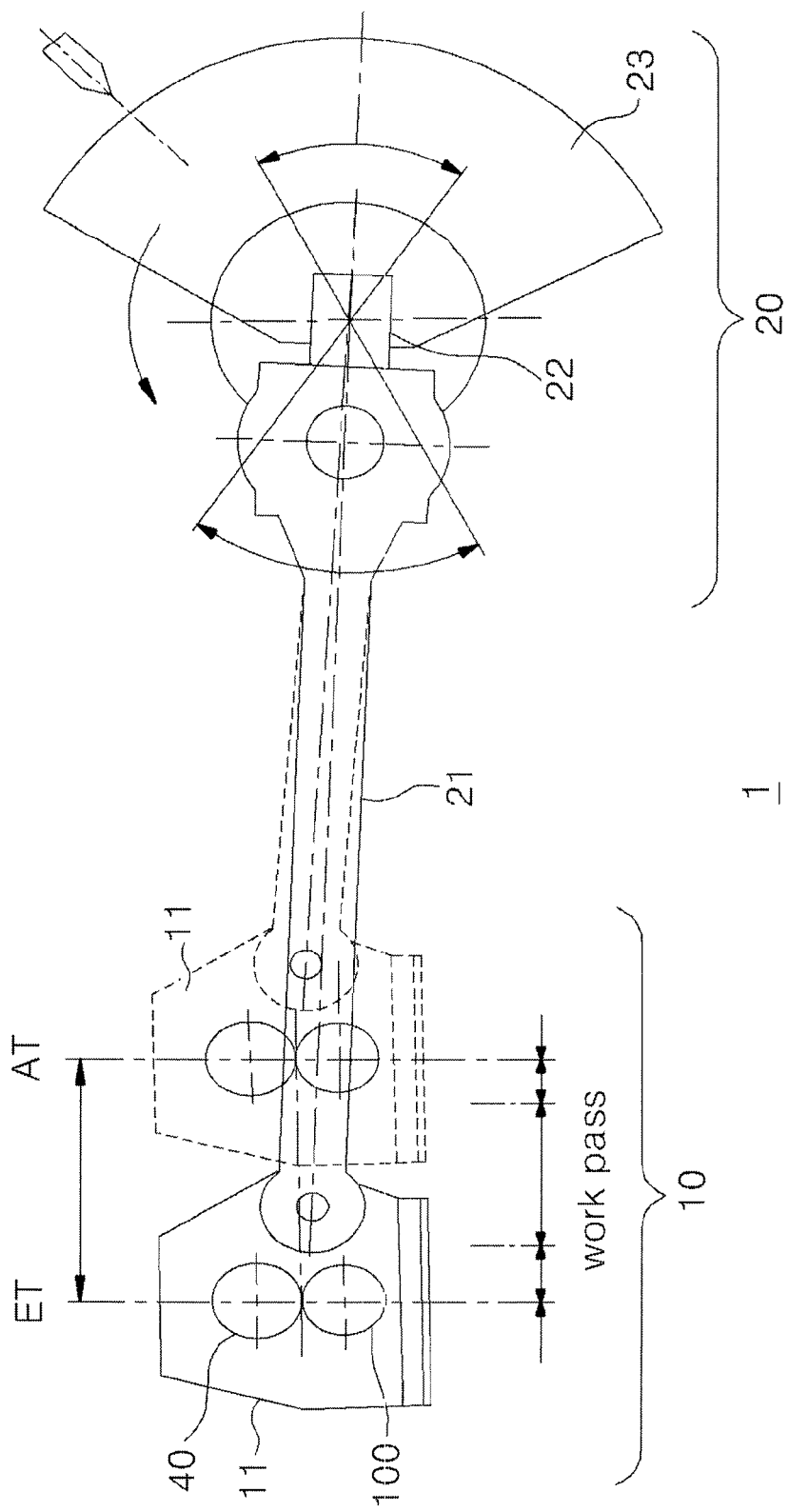
FIG. 9 is a view showing an operation cycle of the saddle of pilgering the zirconium alloy tube.

The embodiment of the present invention illustrates a pilger die 100 and a pilger mandrel 200 which are mounted to a pilgering apparatus 1 (refer to FIGS. 8 and 9). The pilgering apparatus 1 produces a zirconium alloy tube having an outer diameter of 31.75 mm and an inner diameter of 25.65 mm by pilgering a zirconium alloy tube (a material tube) having an outer diameter of 63.5 mm and an inner diameter of 41.66 mm. The pilger dies 100 and the pilger mandrel 200 make it possible to manufacture a dashpot tube for a nuclear fuel assembly using the same pilgering apparatus 1, the dashpot tube having an outer diameter of 22.6 mm and an inner diameter of 21.23 mm, within an allowable error range of 3% or less.

Figure 1:
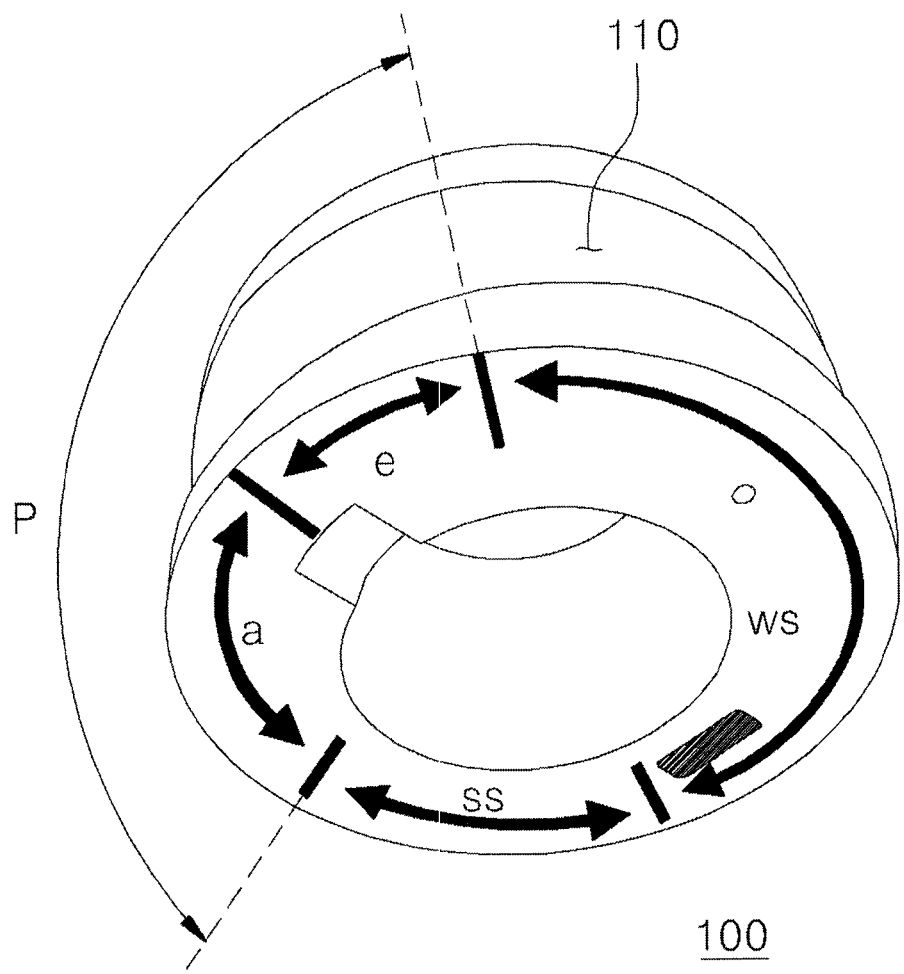
FIG. 1 is a view showing operating sections indicated on a pilger die according to an embodiment of the present invention.
Figure 2:
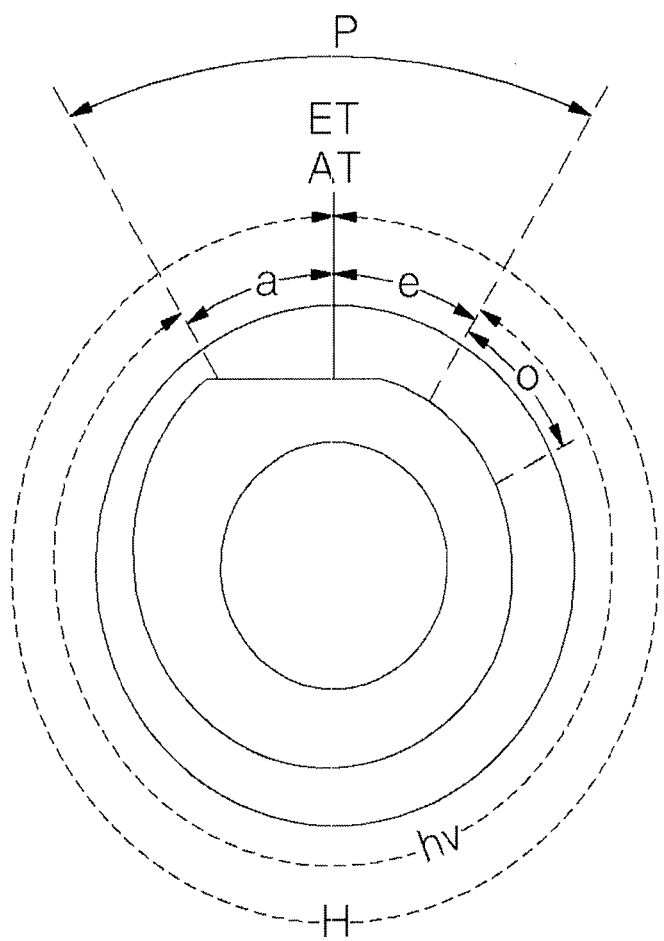
FIG. 2 is a sectional view taken along a center line of a pilger groove of the pilger die of FIG. 1.
Figure 3:
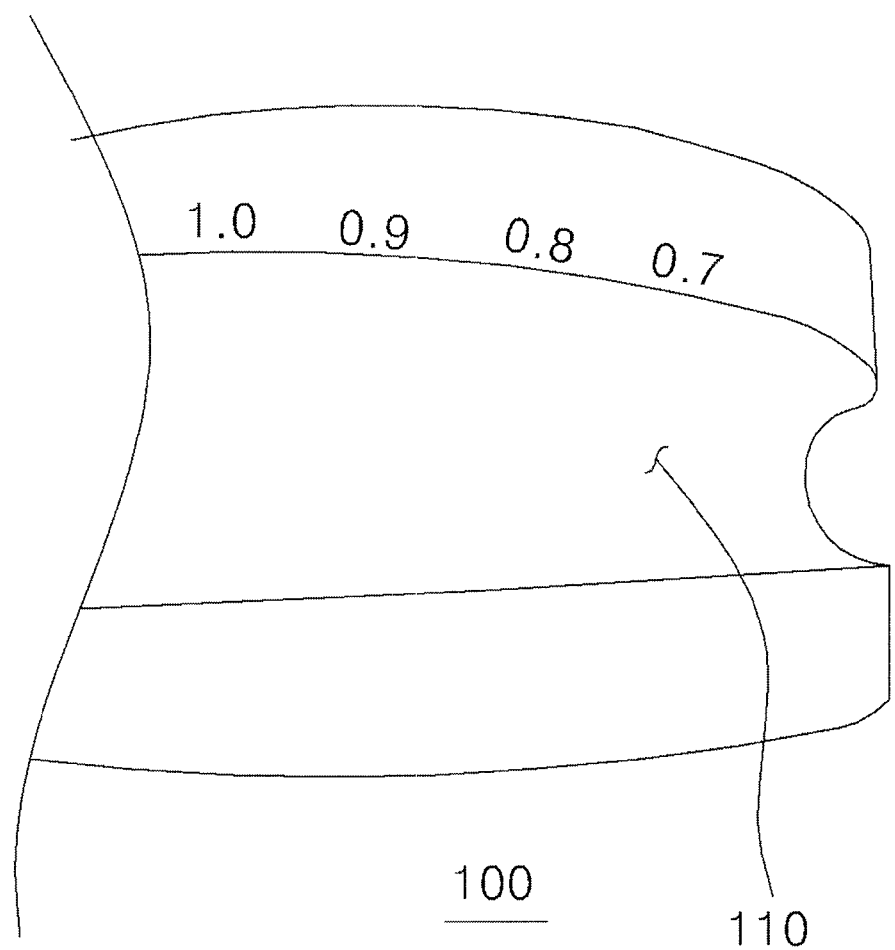
FIG. 3 is a partial view of the pilger die of FIG. 1 to show position coordinates of sectioned parts of a working section.
Figure 4:
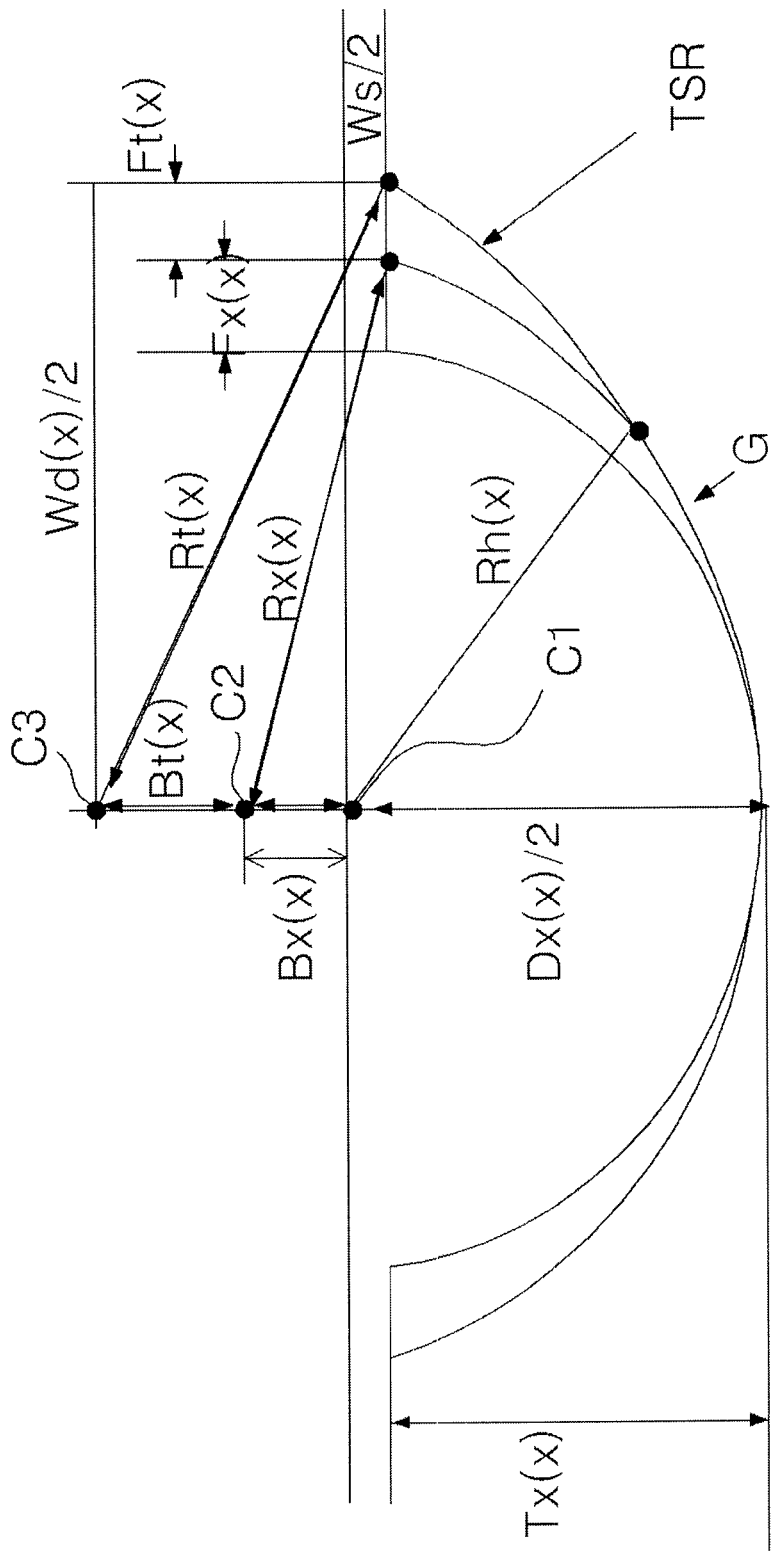
FIG. 4 is a sectional view showing a profile of a portion of the pilger groove of FIG. 1.
Figure 5:
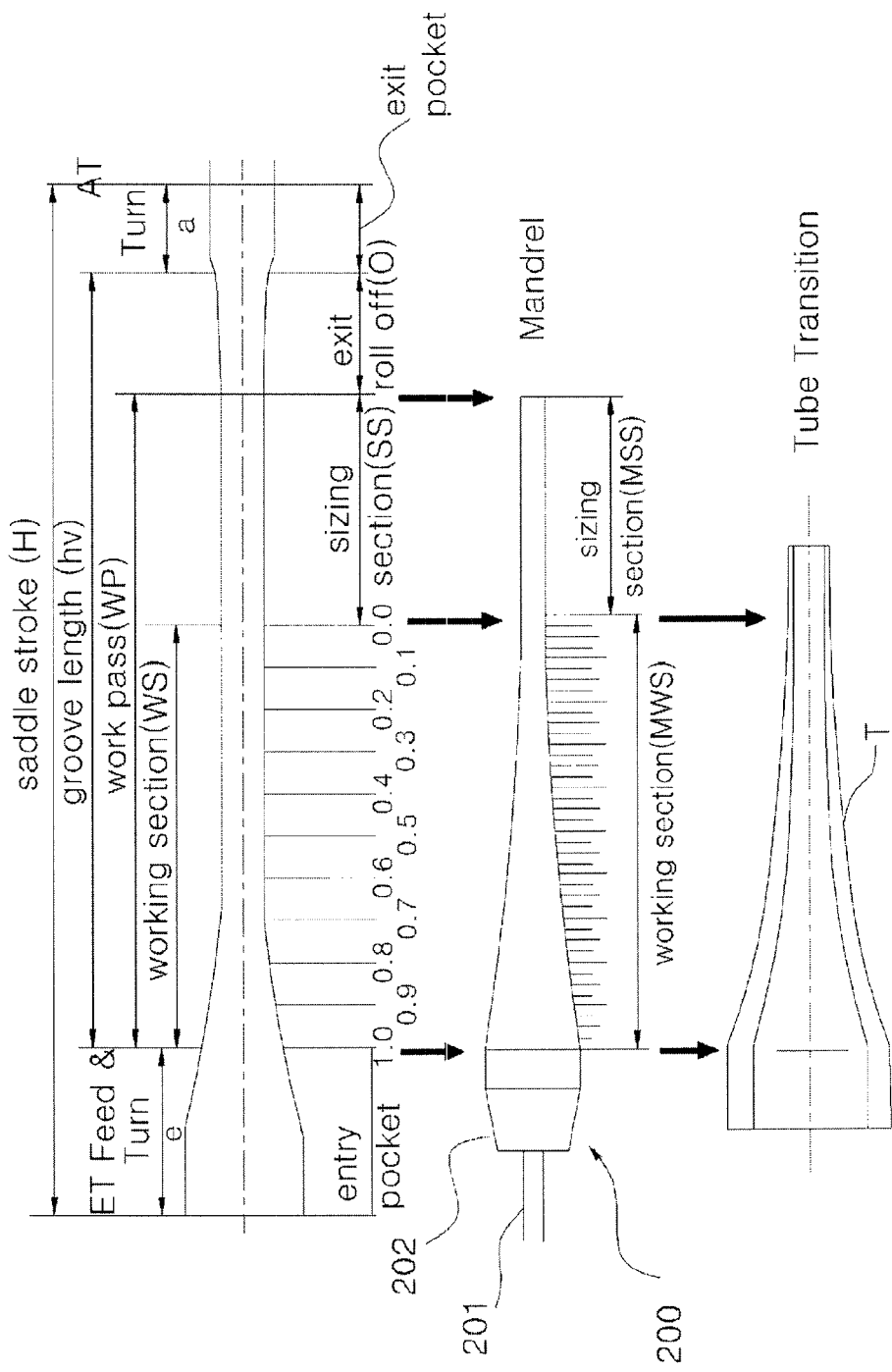
FIG. 5 is of a developmental view of the pilger die of FIG. 1 and of a front view of a pilger mandrel according to an embodiment of the present invention showing an external profile of the pilger mandrel in accordance with operating sections corresponding to the developmental view of the pilger die.

FIG. 1 is a view showing operating sections indicated on the pilger die 100 according to an embodiment of the present invention. FIG. 2 is a sectional view taken along a center line of a pilger groove 110 of the pilger die 100 of FIG. 1. FIG. 3 is a partial view of the pilger die 100 of FIG. 1 that shows the position coordinates of sectioned parts of a working section WS. FIG. 4 is a sectional view of the pilger groove 110 of FIG. 1. FIG. 5 includes a developmental view of the pilger die 100 of FIG. 1 and a front view of a pilger mandrel 200 according to an embodiment of the present invention. FIG. 5 shows an external profile of the pilger mandrel 200 in accordance with operating sections corresponding to the developmental view of the pilger die 100.

As shown in FIGS. 1 through 3, the pilger die 100 has a cylindrical ring shape which is open on a central portion. The pilger groove 110 is formed in an outer surface of the pilger die 100 along the circumferential direction.

As shown in FIGS. 1 through 5, the pilger groove 110 has operating sections, including a pocket section P, a working pass section WP and a roll off section O which are sectioned from each other with respect to the direction in which the pilger groove 110 extends. The pocket section P includes an inlet pocket section e and an outlet pocket section a. The working pass section WP, as shown in FIG. 5, includes a working section WS and a sizing section SS.

As shown in FIGS. 4 and 5, the pilger groove 110 includes a groove G for pilgering the zirconium alloy tube T, and top side reliefs TSR which extend from both sides of the groove G outwards. In FIG. 5, the reference character H denotes a length of a saddle stroke, and the reference character hv denotes a length of the groove G, as shown in FIG. 4, other than the pocket section P.

The pocket section P forms a section in which the zirconium alloy tube T (as shown in FIGS. 5 and 8) is not in contact with the pilger dies 100 when the movement direction of a saddle 11 is changed into the normal direction (in which it moves towards an outlet position AT, that is, towards the right side of the drawing, as shown in FIG. 9) or into a reverse direction (in which it is returned to an inlet position ET, that is, towards the left side of the drawing, as shown in FIG. 9). The inlet pocket section e of the pocket section P (see FIGS. 1 and 2) forms a section between the working section WS and the inlet position ET at which the zirconium alloy tube (T, as shown in FIG. 8) is inserted into a space between the pilger dies 100 that are disposed adjacent to each other and rotate in directions opposite to each other to pilger the zirconium alloy tube T. The outlet pocket section a forms a section between the roll off section O and the outlet position AT.

As shown in FIGS. 3 and 4, the working section WS forms a section in which a radius $Rx(x)$ of a circle defined by the cross-section of the groove (G, as shown in FIG. 4) constantly becomes smaller from a leading end of the working section WS to a following end thereof, so that the outer diameter and the thickness of the zirconium alloy tube (T, as shown in FIG. 8) are reduced. The working section WS is uniformly sectioned, such that a coordinate of a position (the leading end of the working section) at which the pilgering of the zirconium alloy tube (T, as shown in FIG. 8) begins is 1.0 and a coordinate of a position (the tail end of the working section) at which the pilgering using the working section WS is finished is 0.0 (as shown in FIG. 5). Typically, the working section WS is sectioned into 40 equal parts, each of which has a position coordinate x. Here, relative position coordinates x (stations) have 1.0, 0.9, ... 0.0, −0.1, −0.2, ... etc. A substantial distance $X(x)$ from the position coordinate of 0.0 has a value of x·WL/40. Here, the number 40 of sectioned parts of the working section WS may be changed when necessary. Furthermore, the symbol "−" of the position coordinates denotes that it is disposed at the right side with respect to 0.0.

The sizing section SS (see FIG. 5) forms a section which extends from the coordinate 0.0 of the working section WS and has a constant depth to form the zirconium alloy tube (T, as shown in FIG. 8) such that it has the final specifications of an outer diameter of 22.6 mm, an inner diameter of 21.23 mm and a thickness 0.69 mm. Position coordinates x of the sizing section SS are designated by −0.1, −0.2, etc. on the right side based on 0.0 of the working section WS.

The roll off section O forms a section which is deeper than the sizing section SS and increases in depth from a tail end of the sizing section SS to a leading end of the exit pocket section a, so that the pilger dies 100 are gradually separated from the zirconium alloy tube (T, as shown in FIG. 8).

As shown in FIG. 4, the pilger groove 110 having the above-mentioned structure includes the top side relief TSR which is formed by grinding the opposite transverse top sides of the pilger groove 110 such that a radius of a circle defined by the top side relief TSR is greater than the radius $Rx(x)$ of the circle defined by the groove (G, as shown in FIG. 4). In FIG. 4, the characters C1, C2 and C3 respectively denote, in accordance with the position coordinate in the working section WS, a center (C1) of the zirconium alloy tube (T, as shown in FIG. 8), a center (C2) of the circle defined by the groove (G, as shown in FIG. 4), and a center (C3) of the circle defined by the top side relief (TSR, as shown in FIG. 4).

In FIG. 4, the character Ws denotes a die gap 0.406 mm between the two pilger dies. As variables pertaining to the pilger groove 110, $Tx(x)$ denotes the groove depth. $Dx(x)$ denotes an outer diameter of the zirconium alloy tube (T, as shown in FIG. 8) in accordance with the position coordinate in the working section WS. $Dx(x)/2=Rx(x)$ denotes a grinding depth of the groove G, that is, a radius of the circle defined by the groove G (hereinafter, referred to as "a groove radius $Rx(x)$"). $Rt(x)$ denotes a radius of the circle defined by the top side relief (hereinafter, referred to as "top side relief radius $Rt(x)$"). $Bx(x)$ denotes the size of the difference between the radius $Dx(x)/2$ of the zirconium alloy tube (T, as shown in FIG. 8) and the groove radius $Rx(x)$. $Fx(x)$ denotes a distance between the upper end of the top side relief TSR and the corresponding upper end of the groove G. $Bt(x)$ denotes a difference value between the center C3 of the top side relief radius $Rt(x)$ and the center (C1=C2) of the groove radius $Rx(x)$. $Wd(x)$ denotes a width (hereinafter, referred to as "a top side relief width $Wd(x)$") between the upper end of the top side relief (TSR, as shown in FIG. 4) and the axis passing the centers of the zirconium alloy tube (T, as shown in FIG. 8), the circle defined by the groove and the circle defined by the top side relief.

When the entire circumference of the pilger die 100 is 100, the pocket section P, the working section WS, the sizing section SS and the roll off section O of the groove (G, as shown in FIG. 4) respectively have length ratios of 100:23, 100:34.1, 100:8.5 and 100:35 with respect to the circumference of the pilger die 100, within an allowable error range of 3% or less.

The pilger mandrel 200 according to an embodiment of the present invention includes a mandrel shaft 201, a tapered part 202, a mandrel working section MWS and a mandrel sizing section MSS. The mandrel working section MWS, along with the portions of the pilger dies 100 corresponding to the working sections WS, pilgers the zirconium alloy tube (T, as shown in FIG. 8). The diameter of the mandrel working section MWS becomes smaller from a leading end to a tail end thereof along the position coordinates of the working section WS of the pilger die 100.

The mandrel shaft 201 is coupled to a rotation drive unit (not shown) such that the pilger mandrel 200 rotates around the mandrel shaft 201.

The tapered part 202 is configured such that the outer diameter of it is reduced towards an end adjacent to the mandrel shaft 201, so that when the zirconium alloy tube (T, as shown in FIG. 8) is disposed at the inlet position ET between the two pilger dies 100 which are in contact with each other and rotate in opposite directions, the zirconium alloy tube T is not brought into contact with the tapered part 202.

The outer diameter of the mandrel working section MWS becomes smaller from the leading end to the tail end, such that the mandrel working section MWS corresponds to the groove (G, as shown in FIG. 4) of the working section WS of the pilger dies 100, so that the mandrel working section MWS along with the working section WS of the pilger dies 100 can reduce the outer diameter and the thickness of the zirconium alloy tube T.

The mandrel sizing section MSS is formed such that the outer diameter thereof is reduced from the coordinate of 0.0 of the mandrel working section MWS to the tail end of the mandrel sizing section MSS.

The mandrel working section MWS of the pilger mandrel 200 has the same length as that of the working section WS of the pilger dies 100.

Furthermore, the mandrel sizing section MSS has a length which is greater than that of the sizing section SS of the pilger dies 100, such that the tail end of the mandrel sizing section MSS is disposed at a predetermined position of the roll off section O of the pilger dies 100.

Figure 6:
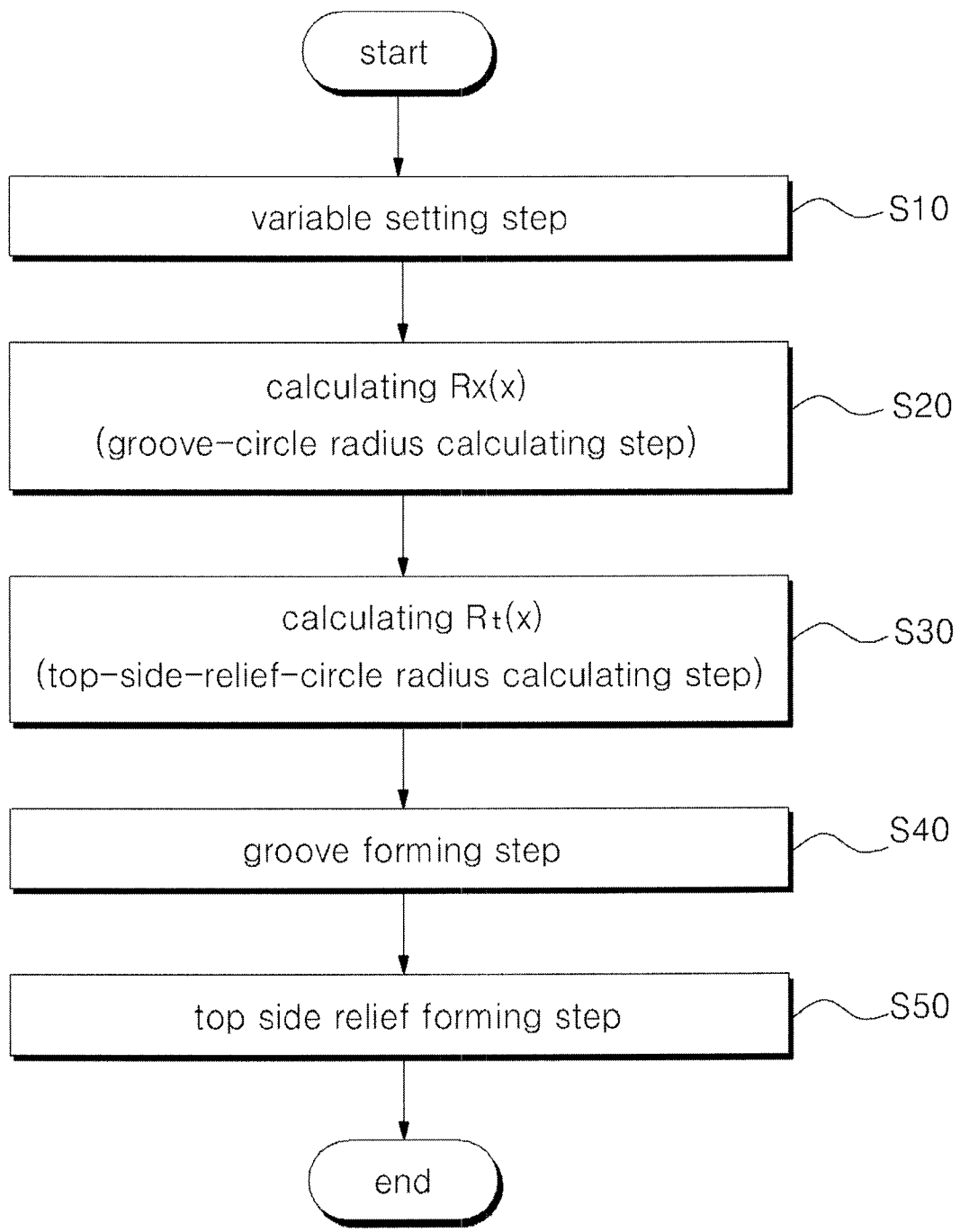
FIG. 6 is a flowchart of a method of manufacturing the pilger die, according to an embodiment of the present invention.
Figure 7:
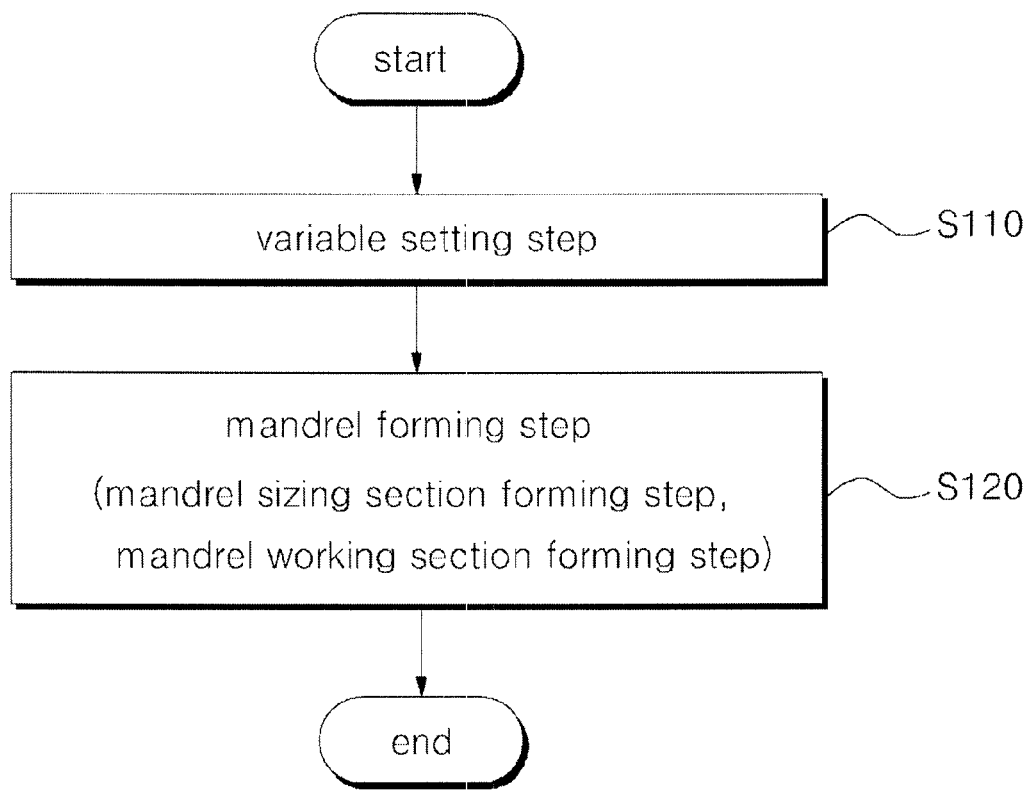
FIG. 7 is a flowchart of a method of manufacturing the pilger mandrel, according to an embodiment of the present invention.

FIG. 6 is a flowchart of a method of manufacturing the pilger dies 100, according to an embodiment of the present invention. FIG. 7 is a flowchart of a method of manufacturing the pilger mandrel 200, according to an embodiment of the present invention.

Hereinafter, a description will be presented of the methods of manufacturing the pilger dies 100 and the pilger mandrel 200 for pilgering a zirconium alloy tube, which was formed to have an outer diameter of 31.75 mm and an inner diameter of 25.65 mm by pilgering an initial zirconium alloy tube having an outer diameter of 63.5 mm and an inner diameter of 41.66 mm, to have an outer diameter of 22.6 mm and an inner diameter of 21.23 mm within an allowable error range of 3% or less.

The pilger dies 100 and the pilger mandrel 200 can be manufactured by the following method: variables to be applied to the following Equations 1 through 12, including a groove radius $Rx(x)$, a top side relief radius $Rt(x)$, the difference $Bx(x)$ between the groove radius $Rx(x)$ and the radius $Dx(x)/2$ of the zirconium alloy tube (T, as shown in FIG. 8), the difference $Bt(x)$ between the top side relief radius $Rt(x)$ and the groove radius $Rx(x)$ and the top side relief width $Wd(x)$, are calculated; the calculated variables are input into software which operates, for example, pilger die grinding machines, etc., of, for example, H. Granlunci Tools KB that form the pilger dies and the pilger mandrel by grinding according to the following die and mandrel forming Equations 1 through 12; and then the grinding machines grind an annular cylindrical body to be formed into the pilger die and the outside surface of a cylindrical rod to be formed into the pilger mandrel.

Pilger Die Equation $$Dx(x)=OD_f+X(x)^{Cx}\cdot(OD_s-OD_f-MT_d(x)\cdot WL-MC(x))+X(x)\cdot MT_d(x)\cdot WL \quad \text{[Equation 1]}$$

Pilger Mandrel Equation $$Mx(x)=ID_f+X(x)^{Cx}\cdot(ID_s-ID_f-MTm(x)\cdot WL-MC(x))+X(x)\cdot MT_m(x)\cdot WL \quad \text{[Equation 2]}$$

From [Equation 1] and [Equation 2], $Dx(x)$=pilger die equation: the outer diameter of the zirconium alloy tube (T, as shown in FIG. 8) at position coordinate x.

x=relative position coordinates, wherein the length of the working section WL is sectioned into equal parts, and the relative position coordinate of the tail end of the working section is designated as 0.0, and relative position coordinates of the sectioned parts are increased in an increment of 0.1 from the position of 0.0 toward the leading end of the working section which has the relative position coordinate of 1.0. Furthermore, the relative position coordinates are reduced in decrements of −0.1 from the position x=0.0 towards the sizing section. As such, x denotes the relative position coordinates (1.0, 0.9, . . . , 0.0, −0.1, −0.2 . . . , etc.) of positions sectioning WL into equal parts.

$X(x)$=a distance rate (x·WL/40) from 0.0 of the working section WS to a position coordinate x, $Mx(0.0)$=21.805 mm, reduced according to $MT_d(x)=Mt_m(x)$ towards the sizing section from x=0, $Mx(1.0)$=24.892 mm, connected smoothly from x=1.0 toward the entry pocket section, and the width of the pocket section is 50 mm or more, $Mx(f)$=19.68 mm, the outer diameter of the tail end of the pilger mandrel, which is smaller than the final inner diameter of the zirconium alloy tube by 5% to 8%, WL=the length of the working section WS, $OD_s$=31.75 mm (the initial outer diameter of the zirconium alloy tube), $OD_f$=22.6 mm (the final outer diameter of the zirconium alloy tube), Cx=1.9-2.3 (a curve value of the groove): an index number controlling a reduction ratio of the outer diameter, and when it is 1, the opposite side of the tapered part becomes parallel, in other words, a tapering rate becomes zero, and in the embodiment of the present invention, Cx is set to 2, $MT_d(x)=MT_m(x)=(21.805 \text{ mm}−19.68 \text{ mm})\cdot(−x)/200$ (a decrement from position coordinate 0.0 toward the exit roll off section to position coordinate x, and the numeral 200 denotes the number of sectioned parts), $MC(x)$=the mandrel clearance=0.381 mm·|x|, $W(x)$=the thickness of the zirconium alloy tube, $Mx(x)$=the outer diameter of the pilger mandrel at position coordinate x, which is less than $ID(x)$ of the zirconium alloy tube at position coordinate x by from 0.7 mm to 3.56 mm, and in the embodiment of the present invention, $Mx(1.0)$=24.892 mm and $Mx(0.0)$=21.805 mm, $ID_s$ (the initial inner diameter of the zirconium alloy tube)=25.65 mm, and $ID_f$ (the inner diameter of the zirconium alloy tube when x=0.0)=21.805 mm.

$$Tx(x)=Dx(x)/2-Ws/2, \text{ where} \quad \text{[Equation 3]}$$

Ws/2=0.203 mm, $Tx(x)$=the depth of the groove, and

Ws=die gap.

$$Bx(x)=Fx(x)=0, \text{ where} \quad \text{[Equation 4]}$$

$Bx(x)$ is the difference between the groove radius $Rx(x)$ and the radius $Dx(x)/2$ of the zirconium alloy tube (T, as shown in FIG. 8), and $Fx(x)$ is the distance between the upper end of the top side relief TSR and the upper end of the groove G.

$$AD(x)=(Dx(x)+Mx(x))/2, \text{ where} \quad \text{[Equation 5]}$$

$Dx(x)=AD(x)-W(x)$, and $AD(x)$=the medial outer diameter between the groove (G, refer to FIG. 4) and the pilger mandrel 200 at position coordinate x.

$$W(x)=(Dx(x)-Mx(x))/2, \text{ where} \quad \text{[Equation 6]}$$

$W(x)$=the thickness of the zirconium alloy tube at position coordinate x.

$$y(x)=x+(AD(1.0)\cdot W(1.0)\cdot TubeInFeed)/(AD(x)\cdot W(x)\cdot WL), \text{ where} \quad \text{[Equation 7]}$$

$y(x)$=a new coordinate x varied depending on a tube feed rate (TubeInFeed), the new coordinate x at which the zirconium alloy tube comes into contact with the pilger die, $AD(1.0)$=the medial outer diameter at position 1.0, $W(1.0)$=3.05 mm: the thickness of the zirconium alloy tube at position 1.0, TubeInFeed=1.7 mm/stroke; a tube feed rate, that is, the length of the zirconium alloy tube that is fed during one stroke in which the saddle reciprocates between ET and AT, and $W(x)$=the thickness of the zirconium alloy tube at position coordinate x.

$$Ft(x)=(Dx(y(x))-Dx(x))/2, \text{ where} \quad \text{[Equation 8]}$$

Ft(x)=the maximum distance between the groove and the top side relief, and

Dx(y(x))=the outer diameter of the zirconium alloy tube at the position y(x).

$$Wd(x)/2=((Dx(x)/2)^2-(Ws/2)^2)^{1/2}+Fx(x)+Ft(x), \text{ where} \quad [\text{Equation 9}]$$

Wd(x)=the width between both top side reliefs, Fx(x)=0

$$Rh(x)=^2)-(Bx(x)\cdot\cos(\alpha(x)))^2)^{1/2}-Bx(x)\cdot\sin(\alpha(x)),$$
where [Equation 10]

Rh(x)=the distance from the center C1 of the tube to the lower end (start point) of the top side relief at position x (as shown in FIG. 4), and $\alpha(x)=55°-20°\cdot(1-x)$ $$Bt(x)=((Wd(x)/2)^2-Rh(x)^2+(Ws/2)^2)/(2(Rh(x)\cdot\sin(\alpha(x))-Ws/2)), \text{ where} \quad [\text{Equation 11}]$$

Bt(x)=the distance between the center C2 of the groove circle defined by the groove (hereinafter, referred to as "groove circle") and the center C3 of the circle defined by the top side relief (hereinafter, referred to as "top-side-relief-circle"), $\alpha(x)=55°-20°\cdot(1-x)$; the angle between a line connecting the center C2 of the groove circle or the center C1 of the zirconium alloy tube to the start point of the top side relief TSR and a horizontal line passing through the center C2 of the groove circle or the center C1 of the zirconium alloy tube, Wd(x)=the width between both top side reliefs, and Ws (die gap)=2·0.203 mm.

$$Rt(x)=((Wd(x)/2)^2+(Bt(x)+Ws/2)^2)^{1/2}, \text{ where} \quad [\text{Equation 12}]$$

Rt(x)=the radius of the too-side-relief-circle.

Mandrel and Die Equations 1 through 12 are used to form the working section WS of the pilger dies 100 and the mandrel working section MWS of the pilger mandrel 200. Furthermore, in the embodiment of the present invention, C1=C2 and Dx(x)/2=Rx(x) are obtained when Bx(x)=Fx(x)=0 is realized. Here, Rx(x) is, at position x, the radius of the groove which is formed by grinding around c1 (refer to FIG. 4).

First, and example method of manufacturing the pilger die will be described with reference to FIGS. 1 through 6, and Mandrel and Die Equations 1 through 12.

As shown in FIG. 6, the example method of manufacturing the pilger dies includes a variable setting step S10, a groove-circle radius calculating step S20, a top-side-relief-circle radius calculating step S30, a groove forming step S40 and a top side relief forming step S50.

At the variable setting step S10, variables for forming the working section WS of the pilger groove 110 of the pilger dies are calculated or set by Mandrel and Die Equations 1 through 12.

At the variable setting step S10, the variables are set by Mandrel and Die Equations 1 through 12 as follows: $OD_s$=31.75 mm, $OD_f$=22.6 mm, Cx=2, the outer diameter decrement $MT_d(x)$ at the right side from x=0.0 is (21.805−19.68)·(−x)/200 (in which there are 200 sectioned parts and this number may vary depending on the outer diameter of the pilger dies), MC(x)=0.381 mm·x, Mx(1.0)=24.892 mm, Mx(0.0)=21.802 mm, $ID_s$=25.65_mm, $ID_f$=21.23 mm, Ws/2=0.203 mm, W(1.0)=3.05 mm, TubeInfeed=1.7 mm/stroke, and $\alpha(x)=55°-20°\cdot(1-x)$.

To comply with the desired specifications with regard to conditions, such as microstructures, corrosion resistance, textures, a tension test, etc., by heat-treating the zirconium alloy tube T processed by a double step pilgering method, at the variable setting step S10, the groove curve value Cx is set to '2', and the angle between a line connecting the center C2 of the groove circle (or the center C1 of the zirconium alloy tube) to the start point of the top side relief TSR and a horizontal line passing through the center C2 of the groove circle (or through the center C1 of the zirconium alloy tube) is set to 55° at the start point of x=1.0, and it is set to 35° at the point of x=0.0.

The reason for this is as follows: in the conventional technique, the groove curve value Cx is set within a range from 1.9 to 2.3 when the pilger dies and the pilger mandrel are designed, but if a value less than 1.9 or greater than 2.3 is applied to Cx, satisfactory properties could not be obtained by suddenly varying the size of the zirconium alloy tube at the point of x=1.0 at which applying pressure to the zirconium alloy tube begins. Furthermore, when the angle is excessively large or small, the lifetime of the pilger dies or the pilger mandrel is shortened, or the quality of the surface of the tube is worsened.

The mandrel clearance MC(x), which denotes a gap between the insert material (zirconium alloy tube) and the pilger mandrel at the point at which the zirconium alloy tube comes into contact with the pilger mandrel, is 0.381 mm when x=1.0. The mandrel clearance MC(x) varies depending on the coordinate x, in detail, reduced by 0.381·x so that the zirconium alloy tube can smoothly come into contact with the pilger mandrel after it comes into contact with the pilger dies. In addition, on the right side of x=0.0, towards the sizing section, the mandrel clearance MC(x) increases again by 0.381 mm·|x|.

Furthermore, to reduce the cross-section by 80% or more compared to its initial value, taking into account restoration of the thickness of the zirconium alloy tube due to springback, Mx(0.0), which is the outer diameter of the pilger mandrel at the point of x=0.0, is set to 21.805 mm, such that it is greater than the final inner diameter 21.23 mm of the zirconium alloy tube by 2.68%. Here, Mx(0.0) can be set such that it is greater than the final inner diameter 21.23 mm of the zirconium alloy tube by 1.5% to 3.5%.

To satisfy the specification desired with respect to the orientation of the texture of the zirconium alloy tube, the length of a portion to be treated by pilgering is set to 299.96 mm, and a thickness change ratio/an outer diameter change ratio (factor Q) is set to 5 or more, so that a hydrogen compound is oriented in the circumferential direction, and the texture is designed such that the tube can be used without any problem. Here, the factor Q can be 4 or more.

The groove-circle radius calculating step S20 is the step of calculating the groove-circle radius Rx(x) of the groove (G, as shown in FIG. 4). First, the depth Tx(x) of the groove G of FIG. 4 at each position coordinate x is obtained by applying the variables to Mandrel and Die Equation 1, and then applying the results to Mandrel and Die Equation 3. The depth Tx(x) obtained by the above process is applied to Mandrel and Die Equation 4, thus calculating the distance Bx(x) between the center C2 of the groove circle and the center C1 of the zirconium alloy tube (T, as shown in FIG. 8) at each position coordinate x. In the present invention, because Bx(x)=0 is satisfied in the working section WS and the mandrel working section MWS, the groove-circle radius Rx(x)=Dx(x)/2 and Tx(x)=Dx(x)/2−Ws/2 are satisfied.

At the top-side-relief-circle radius calculating step S30, the distance Ft(x) between the groove (G, as shown in FIG. 4) and the top side relief (TSR, as shown in FIG. 4), the width Wd(x) between both top side reliefs, the distance Rh(x) from the center C1 of the zirconium alloy tube to the start point of the top side relief TSR at each position coordinate x, and the distance between the center C2 of the groove circle and the center C3 of the top side relief circle are calculated by applying Mandrel and Die Equation 1, Equation 2 and Equations 4 through 7 to Equation 8, Equation 9, Equation 10 and Equation 11 using the calculated groove-circle radius Rx(x).

Thereafter, the top-side-relief-circle radius Rt(x) is calculated by applying the calculated Bt(x) and Wd(x) and the preset value of Ws to Equation 12.

At the groove forming step S40, the operating sections of the groove (G, as shown in FIG. 4), including the pocket section P, the working section WS, the sizing section SS and the roll off section O, are formed by grinding the outer surface of the pilger dies 100 using the variables calculated at the variable setting step.

At the groove forming step S40, the working section WS is formed by grinding such that the groove-circle radius Rx(x) requirement is satisfied.

The sizing section SS is formed by grinding such that it has the value of the Rx(0.0) at point 0.0.

The roll off section O is formed by grinding in such a way that Rx(x) gradually increases from the value of Rx(0.0) in increments of ((21.805 mm, which is greater than the inner diameter of the zirconium alloy tube T at the point of x=0.0 by 2.68%)−(19.68 mm, which is the outer diameter Mx(f) of the tail end of the pilger mandrel))·((−x)/200), so that the pilger dies are prevented from coming into contact with the zirconium alloy tube T at the right side of 0.0. In the roll off section O, Rx(x) may have a predetermined value at which the pilger dies 100 are not in contact with the zirconium alloy tube T.

The pocket section P is formed such that, as shown in FIG. 5, the groove-circle radius Rx(x) linearly increases from the tail end of the roll off section O and becomes constant from a predetermined point while it extends from the exit pocket section a to the inlet pocket section e, so that the zirconium alloy tube (T, as shown in FIG. 8) is prevented from coming into contact with the pilger dies 100. In the entry pocket section e, Rx(x) increases in response to the external shape of the working section WS and becomes constant from the predetermined point, such that the entry pocket section e has the same width as that of the pocket section P. Here, as shown in FIG. 2, the pilger dies are ground such that the center of the bottom of the pocket section P is almost planar. In the embodiment of the present invention, the width of the pocket section P is greater than 50 mm.

At the groove forming step S40, the depth Tx(x) of the groove G is reduced from 15.672 mm at a pilgering start point (the leading end of the working section WS, x=1.0) to 11.097 mm at the point past which the outer diameter of the pilgered tube is not reduced any more (the tail end of the working section WS, x=0.0). The working section WS is formed by grinding the pilger dies along the circumference of the pilger dies such that the groove-circle radius Rx(x) is reduced from 15.875 mm which is obtained by the Tx(x)+Ws/2=Dx(x)/2=Rx(x) at the pilgering start point to 11.3 mm at the tail end of the working section WS, past which the outer diameter of the pilgered tube is not further reduced. Subsequently, the sizing section SS is formed by grinding the pilger die from the tail end of the working section toward the sizing section, such that the depth Tx(x) of the groove G is 11.097 mm and the groove-circle radius Rx(x) is 11.3 mm=22.6_ mm/2. The roll off section O is formed by grinding the pilger dies from the tail end of the sizing section SS such that the groove-circle radius Rx(x) gradually increases from the radius 11.3 mm. Thereafter, the entire groove G is completed by forming the pocket section P.

At the top-side-relief forming step S50, the top side relief (TSR, as shown in FIG. 4) is formed by grinding a portion of the pilger dies corresponding to the working section WS of the groove (G, as shown in FIG. 4) that is formed at the groove forming step S40, such that the radius of the circle defined by the top side relief TSR around the center C3 becomes Rt(x). Here, the top side relief TSR is formed such that the Rt(x) of FIG. 4 is satisfied and the angle α between the horizontal line passing through C1(=C2) and the line connecting C1(=C2) to the start point of the top side relief (TSR, as shown in FIG. 4) is 55° at the point of x=1.0, and is 35° at the point of x=0.0, and the angle α is reduced in decrements of (55°−20°·(1−x)) between the point of x=1.0 and the point of x=0.0. The top side relief TSR of FIG. 4 maintains α=55° on the left of the point x=1.0 and maintains α=35° on the right of the point of x=0.0 to the sizing section SS and the roll off section O. At the pocket section, the opposite side reliefs TSR are smoothly connected to each other.

As such, at the top side relief forming step S50, the top side relief TSR is formed by grinding the pilger dies around C3 of FIG. 4 in such a way that the top-side-relief-circle radius Rt(x) is gradually reduced from 15.931 mm (which is greater than the initial radius of the zirconium alloy tube by 0.390%) at the point of x=1.0 which is the leading end of the working section WS to 11.390 mm (which is greater than the radius of the zirconium alloy tube at the point of x=0.0) at the point of x=0.0, which is the tail end of the working section WS, such that the angle α between the horizontal line passing through the center of (C1=C2) of the circle forming the groove G and the line Rh(x) connecting the center of (C1=C2) of the circle forming the groove G to the start point of the top side relief TSR is 55° at the leading end of the working section WS, and is 35° at the tail end of the working section WS by reducing it in decrements of (55°−20°·(1−x)). The top-side-relief-circle radius Rt(x) at the point (x=1.0) of the leading end of the working section WS may be greater than the initial radius of the zirconium alloy tube by 0.2% to 0.5%. The top-side-relief-circle radius Rt(x) at the point (x=0.0) of the tail end of the working section WS may be greater than the final radius of the zirconium alloy tube T by 0.6% to 0.8%.

In the pilger dies 100 manufactured by the method of FIG. 6, the outer diameter thereof is 280.14 mm, the working section WS is 299.76 mm, the sizing section SS is 75 mm, the roll off section O is 305 mm and the pocket section P is 198.96 mm within an allowable error range of 3% or less.

Furthermore, because Bx(x)=Fx(x)=0 is satisfied in the working section WS, the groove-circle radius Rx(x) is equal to the outer diameter Dx(x)/2 of the zirconium alloy tube T. The groove G of the working section WS is formed such that Tx(1.0) is 15.672 mm and the groove-circle radius Rx(1.0) is 15.875 mm, obtained by (Tx(1.0)+Ws/2), where Tx(1.0) denotes the depth of the center of the bottom of the pilger groove 110 at the point (x=1.0) at which the pilgering of the zirconium alloy tube T begins. In addition, Tx(x) and Rx(x) are reduced from the point of x=1.0 to the point x=0.0, at which a reduction ratio of the outer diameter of the tube becomes zero. In this embodiment, at the point of x=0.0, Tx(0.0) is 11.097 mm, and the grove-circle radius Rx(0.0) is 11.3 mm as obtained by (Tx(0.0)+Ws/2).

In the sizing section SS, the groove-circle radius Rx(0.0) is 11.3 mm, such that the depth of the groove G stays at 11.097 mm. Furthermore, the top side relief TSR is formed such that the angle α between the horizontal line and the line Rh(x) connecting the center (C1=C2) of the groove circle to the start point of the top side relief TSR stays at a constant 35°, and the top-side-relief-circle radius is 11.390 mm.

The roll off section O is formed such that the groove-circle radius is increased in increments of $MT_d=((21.805\_mm-19.68\ mm)\cdot(-x)/200)$. In addition, the top side relief TSR is formed such that the angle α between the horizontal line and the line Rh(x) connecting the center C1 of the groove circle to the start point of the top side relief TSR stays a constant 35°, and the radius of the top side relief circle for grinding the top side relief TSR is increased from 11.390 mm in increments of $MT_d = ((21.805 \text{ mm} - 19.68 \text{ mm}) \cdot (-x)/200)$.

The pocket section P extends such that the width of the upper opening of the groove is 50 mm or more at the leading end of the working section and at the tail end of the roll off section, and the width of the upper opening of the groove in a predetermined portion of the pocket section P is greater than the width of the upper opening at the leading end of the working section and at the tail end of the roll off section. The reason for this is that the zirconium alloy tube must be not in contact with the pilger dies 100 in the predetermined portion of the pocket section P. Therefore, the leading end of the predetermined portion of the pocket section P can be disposed at any position that comes after the tail end of the roll off section.

The calculated or preset values for forming the pilger dies 100 are within an allowable error range of 3% or less.

FIG. 7 is a flowchart of an example method of manufacturing the pilger mandrel. Hereinafter, the method of manufacturing the pilger mandrel of the present invention will be described with reference to FIGS. 1 through 7 and Mandrel and Die Equations 1 through 12.

As shown in FIG. 7, the example method of manufacturing the pilger mandrel includes a variable setting step S110 and a mandrel forming step S120.

At the variable setting step S110, variables are set in the same manner as they were in the variable setting step S10 of the pilger dies manufacturing method. Additional variables are set such that Mx(1.0)=24.892 mm, Mx(0.0)=21.805 mm, Mx(f)=19.68 mm, x=0.0, and $MT_m = ((21.805 \text{ mm} - 19.68 \text{ mm}) \cdot (-x)/200)$. Here, the outer diameter Mx(1.0) of the pilger mandrel at the point x=1.0 is selected from values which are less than the inner diameter of the zirconium alloy tube at the coordinate x by 0.7 mm to 3.56 mm. The outer diameter Mx(0.0) of the pilger mandrel at the point x=0.0 is set to 21.805 mm, which is greater than 21.23_ mm by 2.68%, taking into account the shape restoration of the zirconium alloy tube attributable to the spring-back that occurs when it is pilgered. Furthermore, the outer diameter Mx(0.0) of the pilger mandrel can be greater than 21.23 mm by 1.5% to 3.5%.

At the mandrel forming step S120, the mandrel sizing section MSS is formed, such that the outer diameter Mx(x) of the pilger mandrel is reduced in decrements of $MT_m = ((21.805 \text{ mm} - 19.68 \text{ mm}) \cdot (-x)/200)$ from the Mx(f)=19.68 mm to the outer diameter Mx(0.0) of the pilger mandrel at the point of x=0.0 (this is the "mandrel sizing section forming step" of the present invention). In this embodiment, the mandrel sizing section MSS is formed which has a length appropriate to dispose the tail end thereof at a predetermined position in the roll off section of the pilger dies for the dashpot tube of the nuclear fuel assembly.

Furthermore, the mandrel working section MWS is formed by grinding the outer surface of the pilger mandrel using Mandrel and Die Equation 2 from x=0.0 to x=1.0. The pilger mandrel is formed such that the outer diameter of the pilger mandrel is less than the width of the pocket section P and is increased from x=1.0 towards the roll off section (this is a "mandrel working section forming step" of the present invention). In this embodiment, the mandrel working section MWS is formed which has a length corresponding to the length of the working section of the pilger die for the dashpot tube of the nuclear fuel assembly, and in which the outer diameter of the pilger mandrel is reduced from 24.892 mm at the leading end of the mandrel working section MWS to 21.805 mm at the tail end.

The pilger mandrel has an outer diameter less than the inner diameter of the zirconium alloy tube by 0.7 mm to 3.56 mm.

In the pilger mandrel 200 manufactured by the example method of FIG. 7, the outer diameter of the mandrel working section MWS is reduced from 24.892 mm at the leading end (x=1.0) to 21.805 mm at the tail end (x=0.0).

The outer diameter of the mandrel sizing section MSS is reduced from 21.805 mm at the leading end thereof by $(MT_m(x) = (21.805 \text{ mm} - 19.68 \text{ mm}) \cdot (-x)/200)$ to 19.68 mm at the tail end.

The calculated or preset values that are used when forming the pilger mandrel 200 are also within an allowable error range of 3% or less.

FIG. 8 is a view showing the pilgering apparatus 1 including a saddle unit 10 and a crank drive unit 20, the saddle unit 10 being provided with the pilger dies 100 of FIG. 1 and the pilger mandrel 200 of FIG. 4. FIG. 9 is a view showing an operation cycle of the saddle 11 of pilgering the zirconium alloy tube T.

The two pilger dies 100 and the pilger mandrel 200 which are manufactured by the methods of FIGS. 6 and 7 are installed in the pilgering apparatus 1. As shown in FIGS. 8 and 9, the pilgering apparatus includes the saddle unit 10 in which the saddle 11 reciprocates in the normal direction and the reverse direction, and the crank drive unit 20 which moves the saddle 11 in the normal direction and the reverse direction.

The saddle unit 10 includes the saddle 11 and two racks 13.

The pilger mandrel 200 is disposed between the two pilger dies 100 and provided through the saddle 11 such that both ends of the pilger mandrel 200 protrude out of the opposite sides of the saddle 11. The pilger mandrel 200 is inserted into the zirconium alloy tube T. The upper and lower pilger dies 100 are respectively provided above and below the pilger mandrel 200 to compress the zirconium alloy tube T. The pilger dies 100 and the pilger mandrel 200 compress the zirconium alloy tube T which is provided around the circumferential outer surface of the pilger mandrel 200 so that the outer diameter of the zirconium alloy tube T is reduced and the length thereof is extended. Each pilger die 100 has a pinion 12 which engages with the corresponding rack 13. Thus, the two pilger dies 100 rotate in opposite directions while the saddle 11 moves in the normal or reverse direction.

The crank drive unit 20 includes a weight 23, a crank 22 and a connecting rod 21. The weight 23 is rotated by a motor to move the saddle unit 10 in the normal and reverse directions. The crank 22 converts the rotational motion of the weight 23 into linear reciprocating motion. A first end of the connecting rod 21 is rotatably coupled to the crank 22. A second end of the connecting rod 21 is rotatably coupled to the saddle 11. Thus, the connecting rod 21 linearly reciprocates the saddle 11 in the normal and reverse directions in accordance with the rotation of the weight 23.

As shown in FIG. 8, the pilgering apparatus 1 provided with the pilger dies 100 and the pilger mandrel 200 rotate the pilger mandrel 200 and the zirconium alloy tube T provided around the pilger mandrel 200. Here, the zirconium alloy tube T is moved at 1.7 mm/stroke (TubeInfeed) in the axial direction of the pilger mandrel. The crank drive unit 20 reciprocates the saddle 11 between the inlet position ET and the outlet position AT, and the pinions 12, which engage with the corresponding racks 13 rotate in opposite directions, thus rotate the two pilger dies 100 in opposite directions. Ultimately, the two pilger dies 100 along with the pilger mandrel 200 pilger the zirconium alloy tube T. Here, the pilger dies 100 and the pilger mandrel 200 pilger the zirconium alloy tube such that the outer diameter of the tube is charged from 31.75 mm to 22.6 mm, the inner diameter is changed from 25.65 mm to 21.23 mm and the thickness is changed from 3.05 mm to 0.69 mm, within an allowable error range of 3% or less.

During the process of pilgering the zirconium alloy tube, the cross-section area is reduced by 80% or more, so that the factor Q becomes 5 or more. Therefore, the circumferential arrangement properties of the texture of the zirconium alloy tube can be markedly enhanced.

In the embodiment of the present invention, the pilger dies 100 and the pilger mandrel 200 have been illustrated, which are installed in the pilgering apparatus 1 (as shown in FIGS. 8 and 9), such that a zirconium alloy tube, which was formed to have an outer diameter of 31.75 mm and an inner diameter of 25.65 mm by pilgering (a first-step pass) an initial zirconium alloy tube (a material tube) having an outer diameter of 63.5 mm and an inner diameter of 41.66 mm using the pilgering apparatus 1, can be pilgered by the same pilgering apparatus 1 to produce a dashpot tube having an outer diameter of 22.6 mm and an inner diameter of 21.23 mm within an allowable error range of 3% or less.

Furthermore, the present embodiment can produce a zirconium alloy tube having an outer diameter of less than 31.75 mm and an inner diameter less than 25.65 mm using the pilgering apparatus conducting the first-step pass of the conventional technique in such a way as to set the final outer diameter and inner diameter of the zirconium alloy tube to be pilgered as initial values. Therefore, the pilger dies and the pilger mandrel which are manufactured according to the scope of the present invention make it possible to pilger the zirconium alloy tube having an outer diameter less than 31.75 mm and an inner diameter less than 25.65_mm using the pilgering apparatus to pilger the material tube. Also, the dashpot tubes fall within the scope of the present invention.

As described above, pilger dies and a pilger mandrel which are manufactured by a pilger die manufacturing method and a pilger mandrel manufacturing method according to the present invention can enhance pilgering efficiency and reduce the number of passes that have to be made when pilgering, thus making it possible to produce a dashpot tube having an outer diameter of 31.75 mm or less and an inner diameter of 25.65 mm or less in such a way that a double step pilgering process can be used to process a zirconium alloy tube. Thus, the present invention can produce a better dashpot tube for a nuclear fuel assembly more efficiently while reducing its production cost.

Furthermore, the pilger die and the pilger mandrel according to the present invention make it possible to set a factor Q to 3 or more during the process of pilgering the zirconium alloy tube. Thus, the circumferential arrangement properties of textures of the pilgered zirconium alloy tube are enhanced. Therefore, the present invention can produce a dashpot tube for a nuclear fuel assembly which is resistant to hydrogen embrittlement and has an outer diameter of 31.75 mm or less and an inner diameter of 25.65_ mm or less.

Moreover, the dashpot tube for the nuclear fuel assembly according to the present invention has improved resistance to hydrogen embrittlement, thus keeping the nuclear fuel in a nuclear reactor under safer conditions.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A pilger die of a pilgering apparatus for producing a dashpot tube for a nuclear fuel assembly through two pilgering processes including a first-step pilgering process and a second-step pilgering process within an allowable error range of 3% or less, the pilger die being configured to conduct the second-step pilgering process and comprising:

a pilger groove;

a working section formed along a circumferential outer surface of the pilger die by grinding such that a radius $Rx(x)$ of the pilger groove is reduced from, at a pilgering start point, a half of an initial outer diameter of a first-pilgered zirconium alloy tube formed by the first-step pilgering process of a material tube to, at a pilgering end point, a half of a final outer diameter of a second-pilgered zirconium alloy tube formed by the second-step pilgering process;

a sizing section extending a predetermined length from a tail end of the working section, the sizing section being formed by grinding so that the radius $Rx(x)$ of the pilger groove has a constant value in the half of the final outer diameter of the second-pilgered zirconium alloy tube;

a roll off section extending a predetermined length from a tail end of the sizing section, the roll off section being formed by grinding such that the radius $Rx(x)$ of the pilger groove is increased from the half of the final outer diameter of the second-pilgered zirconium alloy tube; and a pocket section connecting the roll off section to the working section, wherein the working section is formed by grinding such that the radius $Rx(x)$ of the pilger groove is a radius $(Dx(x)/2)$ of a circle having a center at a position spaced apart from the circumferential outer surface of the pilger die by a die gap (Ws) in the radial direction, a pilger die equation for defining the outer diameter of the second-pilgered zirconium alloy tube is $Dx(x)=OD_f+X(x)^{Cx} \cdot (OD_s-OD_f-MT_d(x) \cdot WL-MC(x))+X(x) \cdot MT_d(x) \cdot WL$, and a pilger mandrel equation for defining an outer diameter of a pilger mandrel is $Mx(x)=ID_f+X(x)^{Cx} \cdot (ID_s-ID_f-MTm(x) \cdot WL-MC(x))+X(x) \cdot MT_m(x) \cdot WL$, where:

WL=a length of the working section;

x=relative position coordinates (1.0, 0.9, . . . , 0.0, −0.1, −0.2 . . . ), wherein the length WL of the working section is sectioned into equal parts, and a relative position coordinate of the tail end of the working section is designated as 0.0, and relative position coordinates of the sectioned parts are increased in an increment of 0.1 from the position of 0.0 towards a left side to a leading end of the working section having a relative position coordinate of 1.0, and the relative position coordinates are reduced in decrements of −0.1 from the position x=0.0 towards a right side;

$X(x)$=a distance rate (x·WL/40) from 0.0 of the working section to a position coordinate x;

$Mx(0.0)$=an outer diameter of the pilger mandrel when x is 0.0, $Mx(0.0)$ being set to a value greater than a final inner diameter of the second-pilgered zirconium alloy tube by 1.5% to 3.5%;

$Mx(1.0)$=an outer diameter of the pilger mandrel when x is 1.0, $Mx(1.0)$ being set to a value greater than the initial outer diameter of the first-pilgered zirconium alloy tube by 0.2% to 0.5%;

$OD_s$=the initial outer diameter of the first-pilgered zirconium alloy tube;

$OD_f$=the final outer diameter of the second-pilgered zirconium alloy tube;

$Cx$=a curve value (1.9-2.3) of the groove;

$Mx(x)$=an outer diameter of the pilger mandrel at a position coordinate x;

$MT_d(x)=MT_m(x)$=a decrement of the outer diameter of the pilger mandrel from the position coordinate 0.0 towards the right side to a position coordinate x=(the outer diameter of the pilger mandrel when x is $0.0-Mx(f))\cdot(-x)$/the number of sectioned parts, (x= . . . 0.1, 0.0, −0.1, . . . ,);

$Mx(f)$=an outer diameter of a tail end of the pilger mandrel, $Mx(f)$ being set to a value less than the final inner diameter of the second-pilgered zirconium alloy tube by 5% to 8%;

$Mx(1.0)$, which is an outer diameter of the pilger mandrel when x is 1.0, is set to a value less than an initial inner diameter of the first-pilgered zirconium alloy tube by 0.7 mm to 3.56 mm;

$Mx(0.0)$, which is an outer diameter of the pilger mandrel when x is 0.0, is set to a value greater than a thickness of W(0.0) by 1.5% to 3.5%;

$MC(x)$=a mandrel clearance=$0.381$ mm$\cdot|x|$;

$ID_s$=the initial inner diameter of the first-pilgered zirconium alloy tube; and $ID_f$=the final inner diameter of the second-pilgered zirconium alloy tube.

2. The pilger die as set forth in claim 1, wherein the pilger groove further comprises:

a top side relief formed by grinding the pilger die in a circumferential direction such that a circle defined by the top side relief has a center C3 at a position spaced apart from a center C1 of the circle, defined by the radius $Rx(x)$ of the pilger groove, by $Bt(x)$ in the radial direction of the pilger die, and has a radius $Rt(x)$, wherein:

$Bt(x)=((Wd(x)/2)^2-Rx(x)^2+(Ws/2)^2)/(2(Rx(x)\cdot\sin(\alpha(x))-Ws/2))$;

$\alpha(x)=55°-20°\cdot(1-x)$;

$Rt(x)=((Wd(x)/2)^2+(Bt(x)+Ws/2)^2)^{1/2}$;

$Wd(x)/2=((Dx(x)/2)^2-(Ws/2)^2)^{1/2}+Ft(x)$;

$Ft(x)$ (a maximum distance between the groove and the top side relief)=$(Dx(y(x))-Dx(x))/2$;

$y(x)$ (a new coordinate x varied depending on a tube feed rate (TubeInFeed), the new coordinate x at which the zirconium alloy tube comes into contact with the pilger die)=$x+(AD(1.0)\cdot W(1.0)\cdot TubeInFeed)/(AD(x)\cdot W(x)\cdot WL)$;

$W(x)$ (a thickness of the zirconium alloy tube at a position of x)=$(Dx(x)-Mx(x))/2$;

$AD(x)=(Dx(x)+Mx(x))/2$;

$Dx(y(x))$=an outer diameter of the zirconium alloy tube at a position of $y(x)$;

$AD(1.0)$=a medial outer diameter between the inner diameter of the zirconium alloy tube and the outer diameter of the pilger mandrel at a position of x=1.0;

TubeInFeed=a tube feed rate, which is a length of the zirconium alloy tube that is fed during one stroke in which a saddle reciprocates between an inlet position ET and an outlet position AT; and $\alpha(x)$=an angle between a line connecting the center of the circle (groove circle) defined by the groove to a start point of the top side relief and a horizontal line passing through the center of the groove circle.

3. The pilger die as set forth in claim 2, wherein the top side relief is formed by grinding, such that the angle between the horizontal line and the line connecting the center of the groove circle to the start point of the top side relief is kept constant at 35°, and the radius $Rt(x)$ of the top side relief is set to a value greater than a final radius of the second-pilgered zirconium alloy tube at the tail end (x=0.0) of the working section by 0.6% to 0.8%.

4. The pilger die as set forth in claim 1, wherein the roll off section is formed such that the radius $Rx(x)$ of the pilger groove is increased in an increment of (the outer diameter of the pilger mandrel when x is $0.0-Mx(f))\cdot(-x)$/the number of sectioned parts), where x= . . . 0.1, 0.0, −0.1, . . . .

5. A pilger mandrel of a pilgering apparatus for producing a dashpot tube for a nuclear fuel assembly through two pilgering processes including a first-step pilgering process and a second-step pilgering process within an allowable error range of 3% or less, the pilger mandrel being configured to conduct the second-step pilgering process and comprising:

a mandrel working section having a length corresponding to a length of a working section of a pilger die of the pilgering apparatus, the mandrel working section being formed by grinding in such a way that an outer diameter $Mx(x)$ of the pilger mandrel is reduced from a position of x=1.0 to a position of x=0.0 such that the outer diameter of the pilger mandrel at the position of x=1.0 is less than an initial inner diameter of a zirconium alloy tube by 0.7 mm to 3.56 mm and the outer diameter of the pilger mandrel at the position of x=0.0 is greater than a final inner diameter of the zirconium alloy tube by 1.5% to 3.5%; and a mandrel sizing section extending from a tail end of the mandrel working section along a longitudinal direction of the pilger mandrel, the mandrel sizing section being formed by grinding such that the outer diameter $Mx(x)$ of the pilger mandrel has at a leading end thereof a value greater than the final inner diameter of the zirconium alloy tube by 1.5% to 3.5% and is reduced from the leading end to a tail end thereof along a longitudinal direction of the pilger mandrel, wherein:

a pilger die equation for defining the outer diameter of the zirconium alloy tube is $Dx(x)=OD_f+X(x)^{Cx}\cdot(OD_s-OD_f-MT_d(x)\cdot WL-MC(x))+X(x)\cdot MT_d(x)\cdot WL$; and a pilger mandrel equation for defining an outer diameter of the pilger mandrel is $Mx(x)=ID_f+X(x)^{Cx}\cdot(ID_s-ID_f-MTm(x)\cdot WL-MC(x))+X(x)\cdot MT_m(x)\cdot WL$;

where:

WL=a length of the working section;

x=relative position coordinates (1.0, 0.9, . . . , 0.0, −0.1, −0.2 . . . ), wherein the length WL of the working section is sectioned into equal parts, and a relative position coordinate of the tail end of the working section is designated as 0.0, and relative position coordinates of the sectioned parts are increased in increments of 0.1 from the position of 0.0 towards a left side to a leading end of the working section which has a relative position coordinate of 1.0, and the relative position coordinates are reduced in decrements of −0.1 from the position x=0.0 towards a right side;

$X(x)$=a distance rate $(x\cdot WL/40)$ from 0.0 of the working section to a position coordinate x;

$Mx(0.0)$=an outer diameter of the pilger mandrel when x is 0.0, $Mx(0.0)$ being set to a value greater than a final inner diameter of the zirconium alloy tube by 1.5% to 3.5%;

Mx(1.0)=an outer diameter of the pilger mandrel when x is 1.0, Mx(1.0) being set to a value greater than an initial outer diameter of the zirconium alloy tube by 0.2% to 0.5%;

$OD_s$=an initial outer diameter of the zirconium alloy tube;

$OD_f$=a final outer diameter of the zirconium alloy tube;

Cx=a curve value (1.9-2.3) of a groove of the pilger die;

Mx(x)=an outer diameter of the pilger mandrel at a position coordinate x;

$MT_d(x)=MT_m(x)$=a decrement of the outer diameter of the pilger mandrel from the position coordinate 0.0 towards the right side to a position coordinate x=(the outer diameter of the pilger mandrel when x is 0.0−Mx(f))·(−x)/the number of sectioned parts), (x= . . . 0.1, 0.0, −0.1, . . . );

Mx(f)=an outer diameter of a tail end of the pilger mandrel, Mx(f) being set to a value less than the final inner diameter of the zirconium alloy tube by 5% to 8%;

Mx(1.0) which is an outer diameter of the pilger mandrel when x is 1.0 is set to a value less than an initial inner diameter of the zirconium alloy tube by 0.7 mm to 3.56 mm;

Mx(0.0) which is an outer diameter of the pilger mandrel when x is 0.0 is set to a value greater than a thickness of W(0.0) by 1.5% to 3.5%;

MC(x)=a mandrel clearance=0.381 mm·|x|;

$ID_s$=the initial inner diameter of the zirconium alloy tube; and $ID_f$=the final inner diameter of the zirconium alloy tube.

6. The pilger mandrel as set forth in claim 5, wherein the mandrel sizing section is formed by grinding such that the outer diameter thereof is reduced from the outer diameter Mx(0.0), which is greater than the final inner diameter of the zirconium alloy tube at the position of x=0.0 at which the tail end of the mandrel working section is disposed, in a decrement of (Mx(0.0)−Mx(f))·(−position coordinate)/(the number of sectioned parts), and the outer diameter Mx(f) of the tail end of the pilger mandrel is set to a value less than the final inner diameter of the zirconium alloy tube by 5% to 8%.

7. A method of pilgering a dashpot tube for a nuclear fuel assembly, the method comprising the steps of providing a pilgering apparatus having a pilger die and a pilger mandrel, and pilgering a zirconium alloy tube such that an outer diameter of the zirconium alloy tube is changed from 31.75 mm to 22.6 mm and an inner diameter of the zirconium alloy is changed from 25.65 mm to 21.23 mm within an allowable error range of 3% or less, so that a factor Q, a natural logarithm ratio of a reduction of a tube wall thickness to a reduction of the outer diameter, is 4 or more, wherein the pilger die comprises: a pilger groove;

a working section formed along a circumferential outer surface of the pilger die by grinding such that a radius Rx(x) of the pilger groove is reduced from, at a pilgering start point, a half of an initial outer diameter of the zirconium alloy tube to, at a pilgering end point, a half of a final outer diameter of the zirconium alloy tube formed;

a sizing section extending a predetermined length from a tail end of the working section, the sizing section being formed by grinding so that the radius Rx(x) of the pilger groove has a constant value in the half of the final outer diameter of the zirconium alloy tube;

a roll off section extending a predetermined length from a tail end of the sizing section, the roll off section being formed by grinding such that the radius Rx(x) of the pilger groove is increased from the half of the final outer diameter of the zirconium alloy tube; and a pocket section connecting the roll off section to the working section, wherein the working section is formed by grinding such that the radius Rx(x) of the pilger groove is a radius (Dx(x)/2) of a circle having a center at a position spaced apart from the circumferential outer surface of the pilger die by a die gap (Ws) in the radial direction, and the pilger mandrel comprises:

a mandrel working section having a length corresponding to a length of a working section of the pilger die of the pilgering apparatus, the mandrel working section being formed by grinding in having an outer diameter Mx(x) of the pilger mandrel being reduced from a position of x=1.0 to a position of x=0.0 such that the outer diameter of the pilger mandrel at the position of x=1.0 is less than an initial inner diameter of the zirconium alloy tube by 0.7 mm to 3.56 mm and the outer diameter of the pilger mandrel at the position of x=0.0 is greater than a final inner diameter of the zirconium alloy tube by 1.5% to 3.5%; and a mandrel sizing section extending from a tail end of the mandrel working section along a longitudinal direction of the pilger mandrel, the mandrel sizing section being formed by grinding such that the outer diameter Mx(x) of the pilger mandrel has at a leading end thereof a value greater than the final inner diameter of the zirconium alloy tube by 1.5% to 3.5% and is reduced from the leading end to a tail end thereof along a longitudinal direction of the pilger mandrel, wherein:

a pilger die equation for defining the outer diameter of the zirconium alloy tube is $Dx(x)=OD_f+X(x)^{Cx}\cdot(OD_s-OD_f-MT_d(x)\cdot WL-MC(x))+X(x)\cdot MT_d(x)\cdot WL$; and a pilger mandrel equation for defining an outer diameter of the pilger mandrel is $Mx(x)=ID_f+X(x)^{Cx}\cdot(ID_s-ID_f-MTm(x)\cdot WL-MC(x))+X(x)\cdot MT_m(x)\cdot WL$;

where:

WL=a length of the working section;

x=relative position coordinates (1.0, 0.9, . . . , 0.0, −0.1, −0.2 . . . ), wherein the length WL of the working section is sectioned into equal parts, and a relative position coordinate of the tail end of the working section is designated as 0.0, and relative position coordinates of the sectioned parts are increased in increments of 0.1 from the position of 0.0 towards a left side to a leading end of the working section which has a relative position coordinate of 1.0, and the relative position coordinates are reduced in decrements of −0.1 from the position x=0.0 towards a right side;

X(x)=a distance rate (x·WL/40) from 0.0 of the working section to a position coordinate x;

Mx(0.0)=an outer diameter of the pilger mandrel when x is 0.0, Mx(0.0) being set to a value greater than a final inner diameter of the zirconium alloy tube by 1.5% to 3.5%;

Mx(1.0)=an outer diameter of the pilger mandrel when x is 1.0, Mx(1.0) being set to a value greater than an initial outer diameter of the zirconium alloy tube by 0.2% to 0.5%;

$OD_s$=an initial outer diameter of the zirconium alloy tube;

$OD_f$=a final outer diameter of the zirconium alloy tube;

Cx=a curve value (1.9-2.3) of a groove of the pilger die;

Mx(x)=an outer diameter of the pilger mandrel at a position coordinate x;

$MT_d(x)=MT_m(x)$=a decrement of the outer diameter of the pilger mandrel from the position coordinate 0.0 towards the right side to a position coordinate x=(the outer diameter of the pilger mandrel when x is 0.0−Mx(f))·(−x)/the number of sectioned parts), (x= . . . 0.1, 0.0, −0.1, . . . );

Mx(f)=an outer diameter of a tail end of the pilger mandrel, Mx(f) being set to a value less than the final inner diameter of the zirconium alloy tube by 5% to 8%;

Mx(1.0), which is an outer diameter of the pilger mandrel when x is 1.0, is set to a value less than an initial inner diameter of the zirconium alloy tube by 0.7 mm to 3.56 mm;

Mx(0.0), which is an outer diameter of the pilger mandrel when x is 0.0, is set to a value greater than a thickness of W(0.0) by 1.5% to 3.5%;

MC(x)=a mandrel clearance=0.381 mm·|x|;

$ID_s$=the initial inner diameter of the zirconium alloy tube; and $ID_f$=the final inner diameter of the zirconium alloy tube.

8. A method of manufacturing a pilger die of a pilgering apparatus for producing a dashpot tube for a nuclear fuel assembly through two pilgering processes including a first-step pilgering process and a second-step pilgering process within an allowable error range of 3% or less, the method comprising:

forming a groove on the pilger die from a pilgering start point such that a radius Rx(x) of the groove is a radius (Dx(x)/2) of a circle having a center at a position spaced apart from a circumferential outer surface of the pilger die by a die gap (Ws) in the radial direction, the forming of the groove including:

forming a working section along the circumferential outer surface of the pilger die by grinding such that the radius Rx(x) of the groove is reduced from a half of an initial outer diameter of a first-pilgered zirconium alloy tube to, at a pilgering end point, a half of a final outer diameter of a second-pilgered zirconium alloy tube;

forming a sizing section extending a predetermined length from a tail end of the working section, the sizing section being formed by grinding such that the radius Rx(x) of the groove is constant in the half of the final outer diameter of the second-pilgered zirconium alloy tube;

forming a roll off section extending a predetermined length from a tail end of the sizing section, the roll off section being formed by grinding such that the radius Rx(x) of the groove is increased from the half of the final outer diameter of the second-pilgered zirconium alloy tube; and forming a pocket section connecting the roll off section to the working section; and forming a top side relief by grinding the pilger die in a circumferential direction such that a circle defined by the top side relief has a center C3 at a position spaced apart from a center C1 of the circle, defined by the radius Rx(x) of the groove, by a Bt(x) in the radial direction of the pilger die and has a radius Rt(x), wherein:

WL=a length of the working section;

x=relative position coordinates (1.0, 0.9, . . . , 0.0, −0.1, −0.2 . . . ), wherein the length WL of the working section is sectioned into equal parts, and a relative position coordinate of the tail end of the working section is designated as 0.0, and relative position coordinates of the sectioned parts, are increased in an increment of 0.1 from the position of 0.0 towards a left side to a leading end of the working section which has a relative position coordinate of 1.0, and the relative position coordinates are reduced in decrements of −0.1 from the position x=0.0 towards a right side;

X(x)=a distance rate (x·WL/40) from 0.0 of the working section to a position coordinate x;

Mx(0.0)=an outer diameter of a pilger mandrel of the pilgering apparatus when x is 0.0, Mx(0.0) being set to a value greater than a final inner diameter of the second-pilgered zirconium alloy tube by 1.5% to 3.5%;

Mx(1.0)=an outer diameter of the pilger mandrel when x is 1.0, Mx(1.0) being set to a value greater than the initial outer diameter of the first-pilgered zirconium alloy tube by 0.2% to 0.5%;

$OD_s$=the initial outer diameter of the first-pilgered zirconium alloy tube;

$OD_f$=the final outer diameter of the second-pilgered zirconium alloy tube;

Cx=a curve value (1.9-2.3) of the groove;

Mx(x)=an outer diameter of the pilger mandrel at a position coordinate x, $MT_d(x)=MT_m(x)$=a decrement of the outer diameter of the pilger mandrel from the position coordinate 0.0 towards the right side to a position coordinate x=(the outer diameter of the pilger mandrel when x is 0.0−Mx(f))·(−x)/the number of sectioned parts), (x= . . . 0.1, 0.0, −0.1, . . . );

Mx(f)=an outer diameter of a tail end of the pilger mandrel, Mx(f) being set to a value less than the final inner diameter of the second-pilgered zirconium alloy tube by 5% to 8%;

Mx(1.0), which is an outer diameter of the pilger mandrel when x is 1.0, is set to a value less than an initial inner diameter of the first-pilgered zirconium alloy tube by 0.7 mm to 3.56 mm;

Mx(0.0), which is an outer diameter of the pilger mandrel when x is 0.0, is set to a value greater than a thickness of W(0.0) by 1.5% to 3.5%;

MC(x)=a mandrel clearance=0.381 mm·|x|;

$ID_s$=the initial inner diameter of the first-pilgered zirconium alloy tube;

$ID_f$=the final inner diameter of the second-pilgered zirconium alloy tube;

$Bt(x)=((Wd(x)/2)^2−Rx(x)^2−(Ws/2)^2)/(2(Rx(x)·\sin(\alpha(x))−Ws/2))$;

$\alpha(x)=55°−20°·(1−x)$;

$Rt(x)=((Wd(x)/2)^2+(Bt(x)+Ws/2)^2)^{1/2}$; $Wd(x)/2=((Dx(x)/2)^2−(Ws/2)^2)^{1/2}+Ft(x;$

Ft(x) (a maximum distance between the groove and the top side relief)=(Dx(y(x))−Dx(x))/2;

y(x) (a new coordinate x varied depending on a tube feed rate (TubeInFeed), the new coordinate x at which the zirconium alloy tube comes into contact with the pilger die)=x+(AD(1.0)·W(1.0)·TubeInFeed)/(AD(x)·W(x)·WL);

W(x) (a thickness of the zirconium alloy tube at a position of x)=(Dx(x)−Mx(x))/2;

AD(x)=(Dx(x)+Mx(x))/2;

Dx(y(x))=an outer diameter of the zirconium alloy tube at a position of y(x);

AD(1.0)=a medial outer diameter between the inner diameter of the zirconium alloy tube and the outer diameter of the pilger mandrel at a position of x=1.0;

TubeInFeed=a tube feed rate, a length of the zirconium alloy tube that is fed during one stroke in which a saddle reciprocates between an inlet position ET and an outlet position AT, and α(x)=an angle between a line connecting the center of the circle (groove circle) defined by the groove to a start point of the top side relief and a horizontal line passing through the center of the groove circle.

9. A method of manufacturing a pilger mandrel of a pilgering apparatus for producing a dashpot tube for a nuclear fuel assembly through two pilgering processes including a first-step pilgering process and a second-step pilgering process within an allowable error range of 3% or less, the method comprising:
   forming a mandrel working section by grinding the pilger mandrel such that a length thereof corresponds to a length of a working section of a pilger die of the pilgering apparatus, and an outer diameter Mx(x) of the pilger mandrel is reduced from a position of x=1.0 to a position of x=0.0 such that the outer diameter of the pilger mandrel at the position of x=1.0 is less than an initial inner diameter of a zirconium alloy tube by 0.7 mm to 3.56 mm and the outer diameter of the pilger mandrel at the position of x=0.0 is greater than a final inner diameter of the zirconium alloy tube by 1.5% to 3.5%; and
   forming a mandrel sizing section by grinding the pilger mandrel from a tail end of the mandrel working section along a longitudinal direction of the pilger mandrel, such that the outer diameter Mx(x) of the pilger mandrel has at a leading end thereof a value greater than the final inner diameter of the zirconium alloy tube by 1.5% to 3.5% and is reduced from the leading end to a tail end thereof along the longitudinal direction of the pilger mandrel,
   wherein:
   a pilger die equation for defining the outer diameter of the zirconium alloy tube is $Dx(x)=OD_f+X(x)^{Cx} \cdot (OD_s-OD_f-MT_d(x) \cdot WL-MC(x))+X(x) \cdot MT_d(x) \cdot WL$; and
   a pilger mandrel equation for defining an outer diameter of the pilger mandrel is $Mx(x)=ID_f+X(x)^{Cx} \cdot (ID_s-ID_f-MTm(x) \cdot WL-MC(x))+X(x) \cdot MT_m(x) \cdot WL$,
   where:
   WL=a length of the working section;
   x=relative position coordinates (1.0, 0.9, . . . , 0.0, −0.1, −0.2 . . . ), wherein the length WL of the working section is sectioned into equal parts, and a relative position coordinate of the tail end of the working section is designated as 0.0, and relative position coordinates of the sectioned parts are increased in an increment of 0.1 from the position of 0.0 towards a left side to a leading end of the working section which has a relative position coordinate of 1.0, and the relative position coordinates are reduced in decrements of −0.1 from the position x=0.0 towards a right side;
   $X(x)$=a distance rate (x·WL/40) from 0.0 of the working section to a position coordinate x;
   Mx(0.0)=an outer diameter of the pilger mandrel when x is 0.0, Mx(0.0) being set to a value greater than a final inner diameter of the zirconium alloy tube by 1.5% to 3.5%;
   Mx(1.0)=an outer diameter of the pilger mandrel when x is 1.0, Mx(1.0) being set to a value greater than an initial outer diameter of the zirconium alloy tube by 0.2% to 0.5%;
   $OD_s$=an initial outer diameter of the zirconium alloy tube,
   $OD_f$=a final outer diameter of the zirconium alloy tube,
   Cx=a curve value (1.9-2.3) of the groove;
   Mx(x)=an outer diameter of the pilger mandrel at a position coordinate x;
   $MT_d(x)=MT_m(x)$=a decrement of the outer diameter of the pilger mandrel from the position coordinate 0.0 towards the right side to a position coordinate x=(the outer diameter of the pilger mandrel when x is 0.0−Mx(f))·(−x)/the number of sectioned parts), (x= . . . 0.1, 0.0, −0.1, . . . );
   Mx(f)=an outer diameter of a tail end of the pilger mandrel, Mx(f) being set to a value less than the final inner diameter of the zirconium alloy tube by 5% to 8%;
   Mx(1.0), which is an outer diameter of the pilger mandrel when x is 1.0, is set to a value less than an initial inner diameter of the zirconium alloy tube by 0.7 mm to 3.56 mm;
   Mx(0.0), which is an outer diameter of the pilger mandrel when x is 0.0, is set to a value greater than a thickness of W(0.0) by 1.5% to 3.5%;
   MC(x)=a mandrel clearance=0.381 mm·|x|;
   $ID_s$=the initial inner diameter of the zirconium alloy tube; and
   $ID_f$=the final inner diameter of the zirconium alloy tube.

10. The method as set forth in claim 9, wherein the forming of the mandrel sizing section comprises:
   grinding the pilger mandrel such that the outer diameter of the mandrel sizing section is reduced from the outer diameter Mx(0.0), which is greater than the final inner diameter of the zirconium alloy tube at the position of x=0.0 at which the tail end of the mandrel working section is disposed, in a decrement of (Mx(0.0)−Mx(f))·(−position coordinate)/(the number of sectioned parts); and
   setting the outer diameter Mx(f) of the tail end of the pilger mandrel to a value less than the final inner diameter of the zirconium alloy tube by 5% to 8%.

* * * * *